(12) United States Patent
Jang et al.

(10) Patent No.: US 8,384,678 B2
(45) Date of Patent: Feb. 26, 2013

(54) TOUCH SENSING DEVICE AND METHOD FOR CORRECTING OUTPUT THEREOF

(75) Inventors: Suhyuk Jang, Daegu (KR); Hwanjoo Lee, Daegu (KR)

(73) Assignee: LG Display Co. Ltd., Seoul (KR)

( * ) Notice: Subject to any disclaimer, the term of this patent is extended or adjusted under 35 U.S.C. 154(b) by 813 days.

(21) Appl. No.: 12/499,599

(22) Filed: Jul. 8, 2009

(65) Prior Publication Data

US 2010/0097355 A1 Apr. 22, 2010

(30) Foreign Application Priority Data

Oct. 20, 2008 (KR) .................. 10-2008-0102577
Dec. 4, 2008 (KR) .................. 10-2008-0122690

(51) Int. Cl.
*G06F 3/041* (2006.01)

(52) U.S. Cl. ...................... 345/173; 345/178
(58) Field of Classification Search .................. None
See application file for complete search history.

(56) References Cited

U.S. PATENT DOCUMENTS

| 2003/0204717 A1* | 10/2003 | Kuehnel .................. 713/150 |
| 2006/0026521 A1* | 2/2006 | Hotelling et al. .............. 715/702 |
| 2006/0097991 A1* | 5/2006 | Hotelling et al. .............. 345/173 |
| 2007/0063990 A1* | 3/2007 | Park et al. .................. 345/173 |
| 2007/0262969 A1* | 11/2007 | Pak .................. 345/173 |
| 2008/0158178 A1* | 7/2008 | Hotelling et al. .............. 345/173 |
| 2008/0252608 A1* | 10/2008 | Geaghan .................. 345/173 |
| 2008/0288548 A1* | 11/2008 | Lawler et al. .................. 707/200 |

FOREIGN PATENT DOCUMENTS

| JP | 11-143626 | 5/1999 |
| JP | 2000-172446 | 6/2000 |
| JP | 2000172446 A * | 6/2000 |
| JP | 2007-047991 | 2/2007 |
| JP | 2007-087394 | 4/2007 |

OTHER PUBLICATIONS

Machine translation of JP-2000-172446.*

* cited by examiner

*Primary Examiner* — Amare Mengistu
*Assistant Examiner* — Antonio Xavier
(74) *Attorney, Agent, or Firm* — Brinks Hofer Gilson & Lione

(57) ABSTRACT

A touch sensing device and a method for correcting an output thereof are disclosed. The touch sensing device includes a touch sensor array including a plurality of touch sensors, a plurality of integrated circuits (ICs) that converts an output of the touch sensor array into digital data and generates raw data, and a data correction unit that generates correction values using differential values between adjacent raw data in the raw data generated by the ICs and removes successive correction values equal to or greater than a predetermined critical value from the correction values when a number of successive correction values equal to or greater than the predetermined critical value is less than a predetermined reference value.

15 Claims, 30 Drawing Sheets

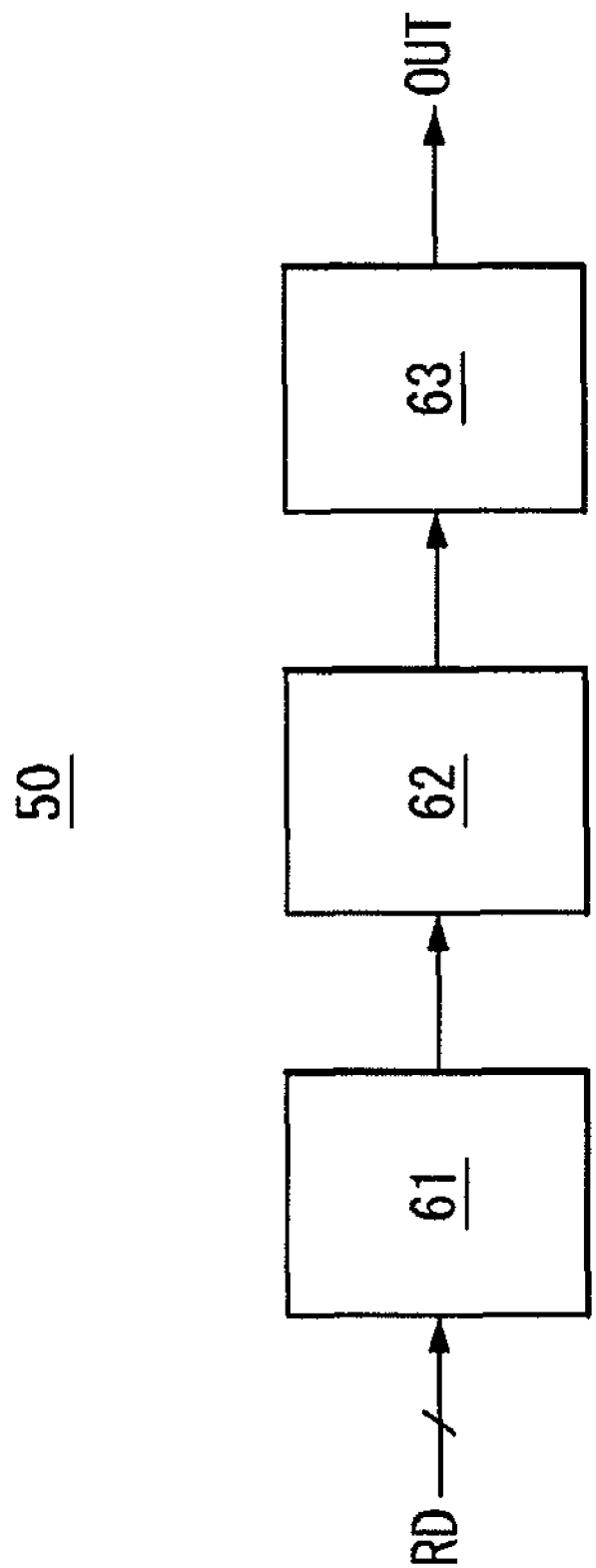

FIG. 27

| Raw Data | MD | 1st RD | 2nd RD | 3rd RD | 4th RD | 5th RD | 6th RD | 7th RD | 8th RD |
|---|---|---|---|---|---|---|---|---|---|
| Y1 | 50 | 43 | 46 | 47 | 49 | 52 | 52 | 54 | 56 |
| Y2 | 50 | 44 | 47 | 49 | 49 | 49 | 51 | 55 | 57 |
| Y3 | 55 | 44 | 48 | 53 | 61 | 62 | 58 | 56 | 56 |
| Y4 | 60 | 45 | 48 | 55 | 82 | 73 | 57 | 58 | 60 |
| Y5 | 53 | 43 | 47 | 51 | 56 | 56 | 57 | 56 | 57 |
| Y6 | 50 | 45 | 46 | 48 | 47 | 49 | 53 | 55 | 59 |

FIG. 28

| Δvalue | Δ1 | Δ2 | Δ3 | Δ4 | Δ5 | Δ6 | Δ7 | Δ8 |
|---|---|---|---|---|---|---|---|---|
| Y1 | 7 | 3 | 1 | 2 | 3 | 0 | 2 | 2 |
| Y2 | 6 | 3 | 2 | 0 | 0 | 2 | 4 | 2 |
| Y3 | 11 | 4 | 3 | 8 | 1 | -4 | -2 | 0 |
| Y4 | 15 | 3 | 7 | 27 | 18 | 5 | 1 | 2 |
| Y5 | 10 | 4 | 4 | 5 | 0 | 1 | -1 | 1 |
| Y6 | 5 | 1 | 2 | -1 | 2 | 4 | 2 | 4 |

FIG. 29

| Δvalue+offset | D1 | D2 | D3 | D4 | D5 | D6 | D7 | D8 |
|---|---|---|---|---|---|---|---|---|
| Y1 | 519 | 515 | 513 | 514 | 515 | 512 | 514 | 514 |
| Y2 | 518 | 515 | 514 | 512 | 512 | 514 | 516 | 514 |
| Y3 | 523 | 516 | 517 | 520 | 513 | 508 | 510 | 512 |
| Y4 | 527 | 517 | 519 | 539 | 530 | 514 | 513 | 514 |
| Y5 | 522 | 516 | 516 | 517 | 512 | 513 | 511 | 513 |
| Y6 | 517 | 513 | 514 | 511 | 514 | 516 | 514 | 516 |

US 8,384,678 B2

TOUCH SENSING DEVICE AND METHOD FOR CORRECTING OUTPUT THEREOF

RELATED APPLICATIONS

This application claims the benefit of Korea Patent Application No. 10-2008-0102577 filed on Oct. 20, 2008 and Korea Patent Application No. 10-2008-0122690 filed on Dec. 4, 2008, which are incorporated herein by reference for all purposes as if fully set forth herein.

BACKGROUND

1. Field of the Disclosure

The embodiments disclosed herein relate to a touch sensing device and a method for correcting an output of the touch sensing device capable of increasing sensibility and accuracy of touch sensors.

2. Discussion of the Related Art

With a recent trend toward thin profile and lightness in weight of electric home appliances or personal digital appliances, a button switch as user's input means has been substituted for a touch sensor.

A capacitance type touch sensor, a resistance type touch sensor, a pressure type touch sensor, an optical type touch sensor, an ultrasonic type touch sensor, and the like, are known as the touch sensor. A touch screen is composed of a plurality of touch sensors formed on a display device.

The touch sensors formed on the display device are connected to power lines and are electrically coupled with signal lines of the display device. Hence, much noise is mixed in outputs of the touch sensors. Even if there is no touch input, a deviation between outputs of the neighboring touch sensors greatly appears. The deviation is referred to as a swing level of touch data. A touch signal processing circuit recognizes touch data when the touch data equal to or greater than a predetermined threshold value is input to a sum of a swing level of touch data and noise. As the noise and the swing level of the touch data increase, the sensibility of the touch sensors is reduced. In particular, the sensibility of the touch sensors is affected more by the swing level than by the noise. Accordingly, the swing level of touch data has to decrease so as to increase the sensibility of the touch sensors.

The touch signal processing circuit may include a plurality of integrated circuits, and a deviation between the integrated circuits adversely affects an output between the integrated circuits. As a result, touch recognition error occurs.

The touch signal processing circuit compares previous frame data with current frame data and corrects the touch data depending on a comparative result. However, because frame memories are needed to correct the touch data, the cost of the touch signal processing circuit increases.

BRIEF SUMMARY

In one aspect, there is a touch sensing device comprising a touch sensor array including a plurality of touch sensors, a plurality of integrated circuits (ICs) that converts an output of the touch sensor array into digital data and generates raw data, and a data correction unit that generates correction values using differential values between adjacent raw data in the raw data generated by the ICs and removes successive correction values equal to or greater than a predetermined critical value from the correction values when a number of successive correction values equal to or greater than the predetermined critical value is less than a predetermined reference value.

In another aspect, there is a method for correcting an output of a touch sensing device comprising converting outputs of a plurality of touch sensors into digital data by a plurality of integrated circuits (ICs) connected to the plurality of touch sensors to generate raw data, generating correction values using differential values between adjacent raw data in the raw data generated by the ICs, and removing successive correction values equal to or greater than a predetermined critical value from the correction values when a number of successive correction values equal to or greater than the predetermined critical value is less than a predetermined reference value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 9 is a block diagram illustrating a circuit configuration of a touch data correction circuit;

FIGS. 27 to 29 illustrate mirror data calculated using an average value between raw data, correction values calculated using the mirror data, and final correction values obtained by adding an offset value to each of the correction values.

DETAILED DESCRIPTION OF THE DRAWINGS AND THE PRESENTLY PREFERRED EMBODIMENTS

Reference will now be made in detail embodiments of the disclosure examples of which are illustrated in the accompanying drawings.

As shown in FIGS. 1 to 7, a touch sensor and a display device according to an embodiment of the disclosure includes a touch sensing device and a display device.

Figure 8:
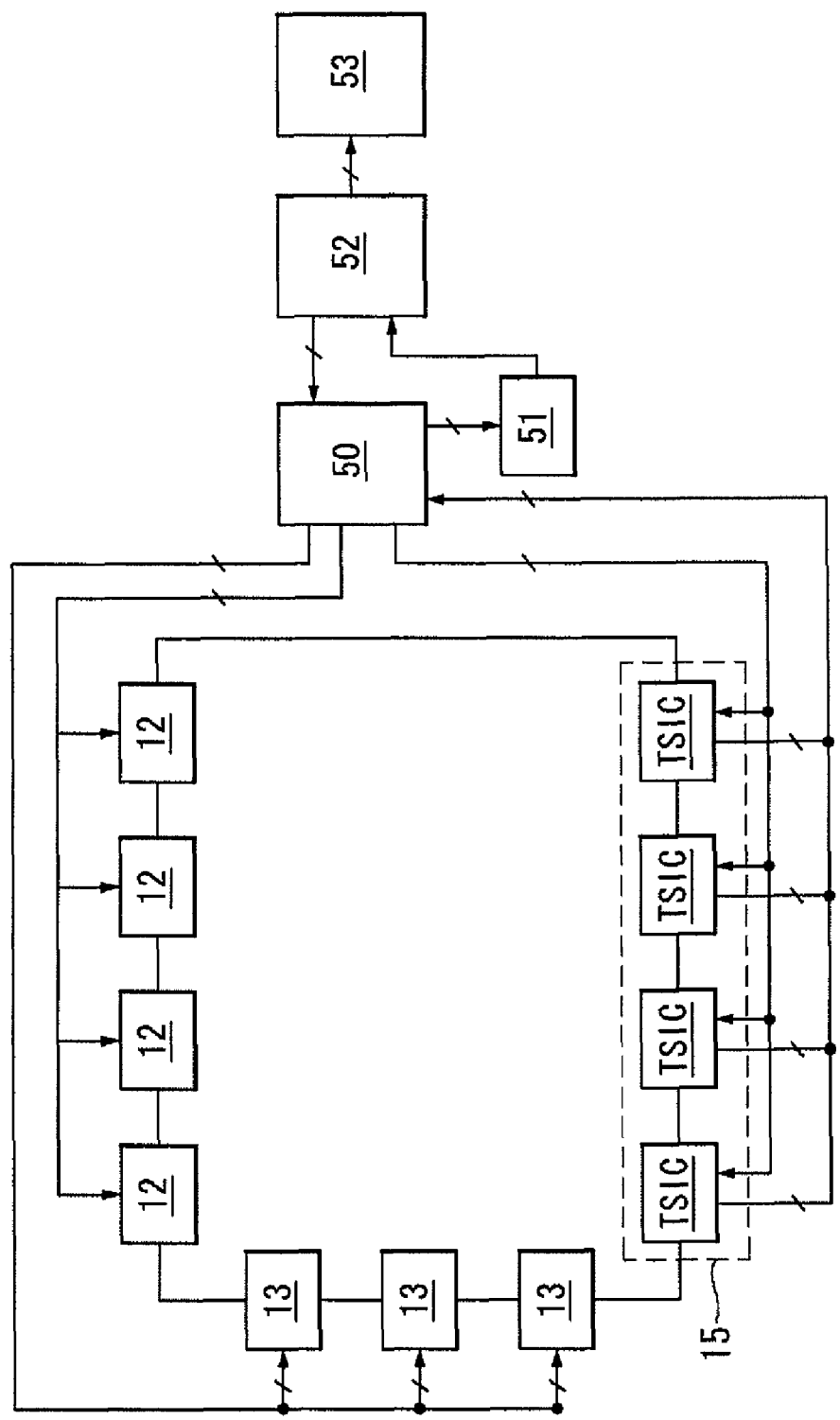
FIG. 8 illustrates an experimental device of touch data.

The touch sensing device includes a touch sensor array 14 and a touch signal processing circuit 15 for processing output signals of the touch sensor array 14. The touch sensor array 14 includes a plurality of touch sensors connected to readout lines R1 to Ri. As shown in FIGS. 1 to 4, the touch sensor array 14 may be stacked on a display panel 10 of the display device, may be inserted in the display panel 10, or may be formed inside a pixel array of the display panel 10 so that the touch sensor array 14 and the display panel 10 form an integral body. The touch signal processing circuit 15, as shown in FIG. 8, includes a plurality of touch sensor integrated circuits (TSICs). The touch signal processing circuit 15 supplies a driving voltage to the touch sensors of the touch sensor array 14 and converts differential voltages between touch data voltages output from the touch sensors through the readout lines R1 to Ri and a reference voltage into digital data.

The touch sensing device further includes a touch data correction circuit that equalizes swing levels of touch data and corrects a deviation between the TSICs. The touch data correction circuit will be described later.

The display device includes the display panel 10, a timing controller 11, a data drive circuit 12, and a scan drive circuit 13. The display device may be implemented as a flat panel display such as a liquid crystal display (LCD), a field emission display (FED), a plasma display panel (PDP), and an electroluminescence device (EL) such as an organic light emitting diode (OLED) display. In the embodiment, the liquid crystal display will be described as the display device.

Figure 5:
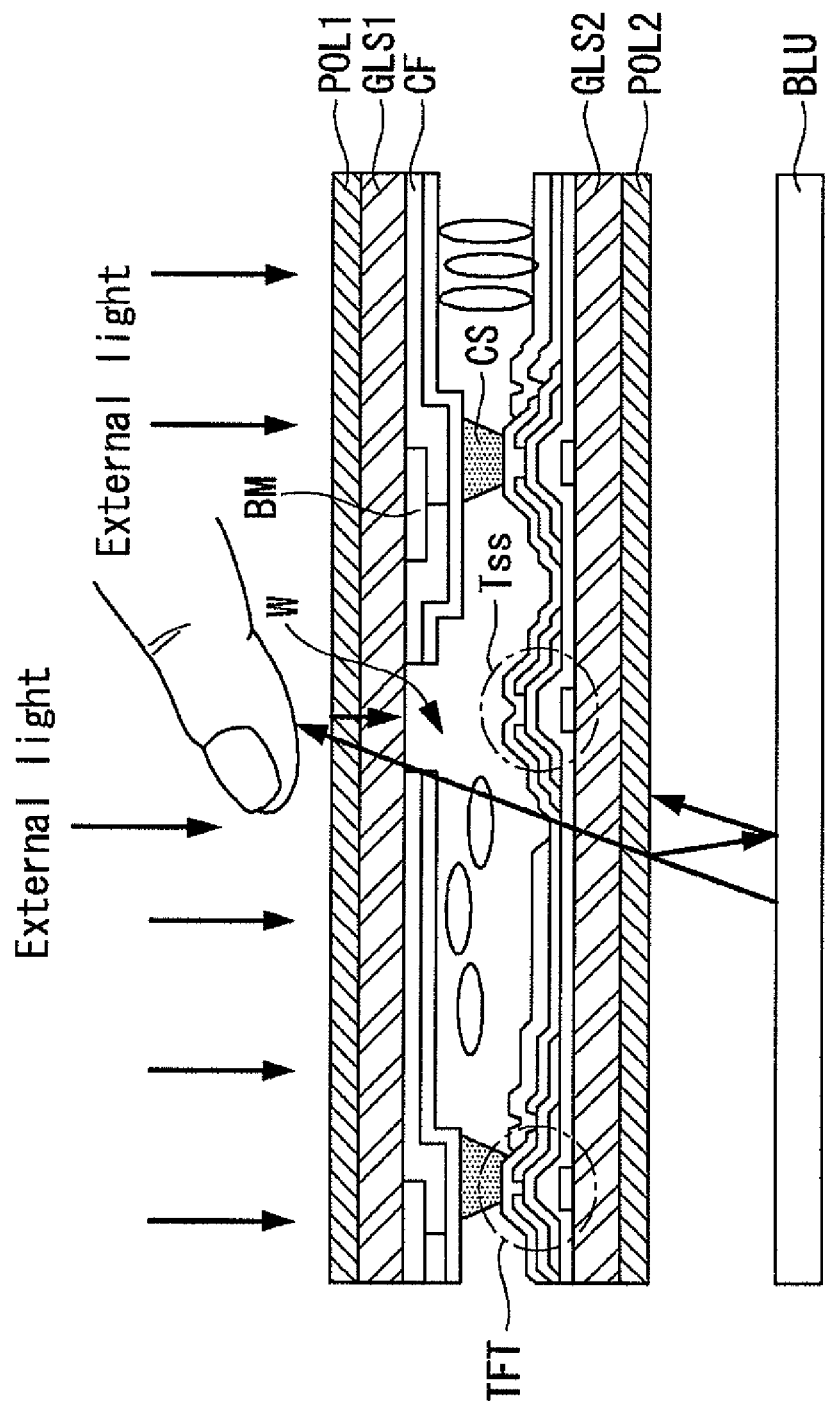
FIG. 5 is a cross-sectional view illustrating an exemplary structure of touch sensors mounted inside a pixel array of a display panel.

As shown in FIG. 5, a liquid crystal display may further include a backlight unit BLU providing light to the display panel 10. The backlight unit BLU may be implemented as an edge type backlight unit, in which light sources are positioned opposite the side of a light guide plate, or a direct type backlight unit, in which light sources are positioned under a diffusion plate.

The display panel 10 includes an upper glass substrate GLS1, a lower glass substrate GLS2, and a liquid crystal layer between the upper and lower glass substrates GLS1 and GLS2. The lower glass substrate GLS2 of the display panel 10, as shown in FIGS. 1 to 6, includes a plurality of data lines D1 to Dm, a plurality of gate lines G1 to Gn crossing the data lines D1 to Dm, a plurality of thin film transistors (TFTs), each of which is formed at each of crossings of the data lines D1 to Dm and the gate lines G1 to Gn, a plurality of pixel electrodes 1 for charging liquid crystal cells Clc to a data voltage, a storage capacitor Cst that is connected to the pixel electrodes 1 and keeps a voltage of the liquid crystal cells Clc constant, and the like. The liquid crystal cells Clc are arranged in a matrix format through a crossing structure of the data lines D1 to Dm and the gate lines G1 to Gn. The upper glass substrate GLS1 of the display panel 10 includes a black matrix BM, a color filter CF, a common electrode 2, and the like. The common electrode 2 is formed on the upper glass substrate GLS1 in a vertical electric drive manner, such as a twisted nematic (TN) mode and a vertical alignment (VA) mode. The common electrode 2 and the pixel electrode 1 are formed on the lower glass substrate GLS2 in a horizontal electric drive manner, such as an in-plane switching (IPS) mode and a fringe field switching (FFS) mode. Polarizing plates POL1 and POL2 are respectively attached to the upper and lower glass substrates GLS1 and GLS2. Alignment layers for setting a pre-tilt angle of liquid crystals in an interface contacting the liquid crystals are respectively formed on the upper and lower glass substrates GLS1 and GLS2. A column spacer CS may be formed between the upper and lower glass substrates GLS1 and GLS2 to keep cell gaps of the liquid crystal cells Clc constant.

Figure 7:
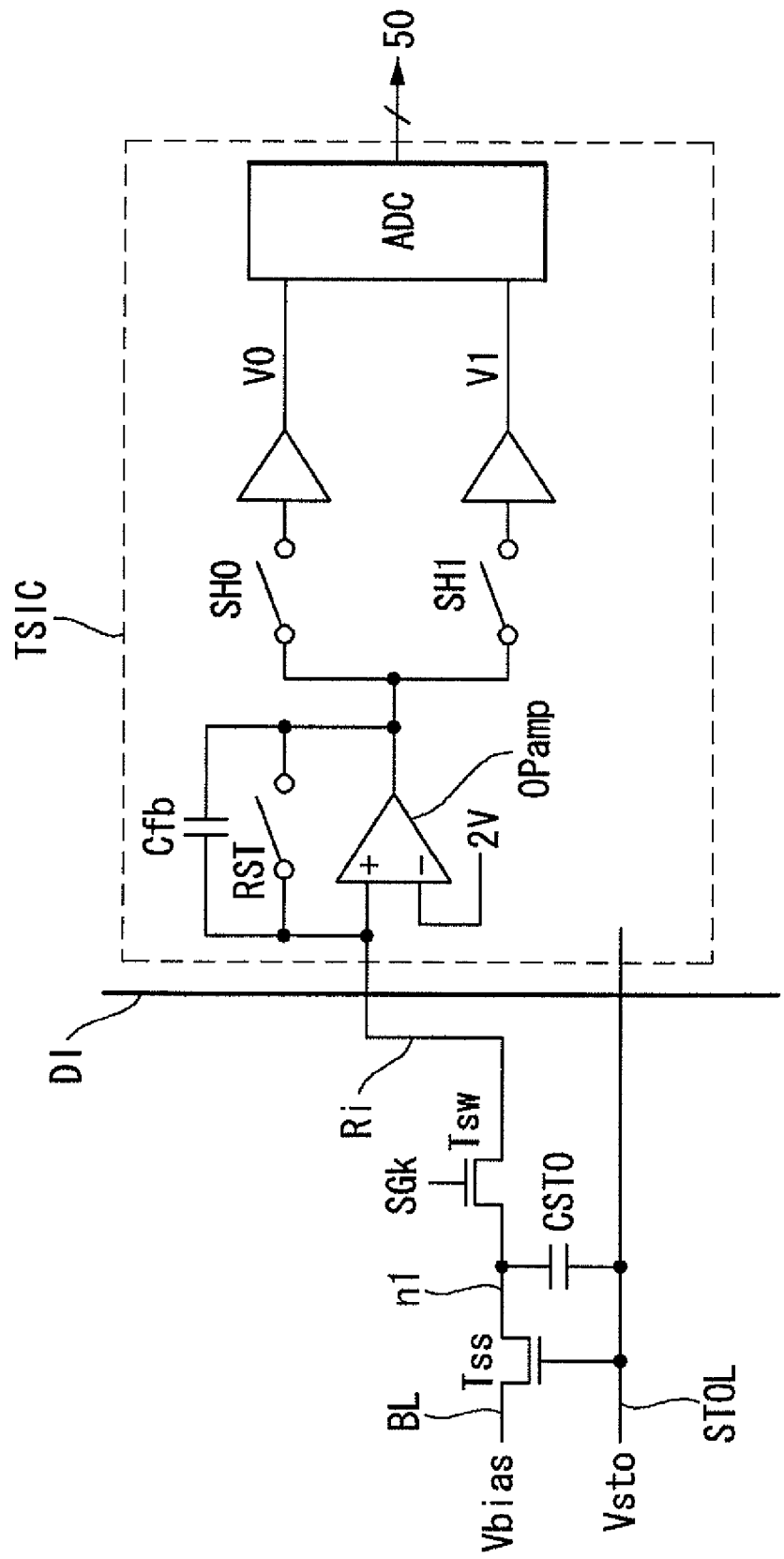
FIG. 7 is an equivalent circuit diagram illustrating touch sensors mounted inside a pixel array of a display panel and a touch sensor integrated circuit (TSIC)

The timing controller 11 receives timing signals, such as a data enable signal DE and a dot clock CLK from the outside to generate control signals for controlling operation timing of each of the data drive circuit 12 and the scan drive circuit 13. A control signal for controlling operation timing of the scan drive circuit 13 includes a gate start pulse GSP, a gate shift clock GSC, a gate output enable signal GOE, a shift direction control signal DIR, and the like. A control signal for controlling operation timing of the data drive circuit 12 includes a source sampling clock SSC, a source output enable signal SOE, a polarity control signal POL, and the like. The timing controller 11 controls the data drive circuit 12 and the scan drive circuit 13 and also may generate a control signal for controlling input/output operation timing of the touch signal processing circuit 15 to control the touch signal processing circuit 15. For example, the timing controller 11, as shown in FIG. 7, may generate a reset signal RST, a reference voltage sampling signal SH0, a touch voltage sampling signal SH1, etc. for controlling operation timing of the TSICs.

The data drive circuit 12 includes a plurality of source drive integrated circuits (ICs). The data drive circuit 12 latches digital video data RGB under the control of the timing controller 11 and converts the digital video data RGB into analog positive/negative gamma compensation voltage to generate the analog positive/negative gamma compensation voltage. The data drive circuit 12 supplies the analog positive/negative gamma compensation voltage to the data lines D1 to Dm.

The scan drive circuit 13 includes one or more scan drive ICs. The scan drive circuit 13 sequentially supplies a scan pulse (or a gate pulse) to the gate lines G1 to Gn.

Figure 1:
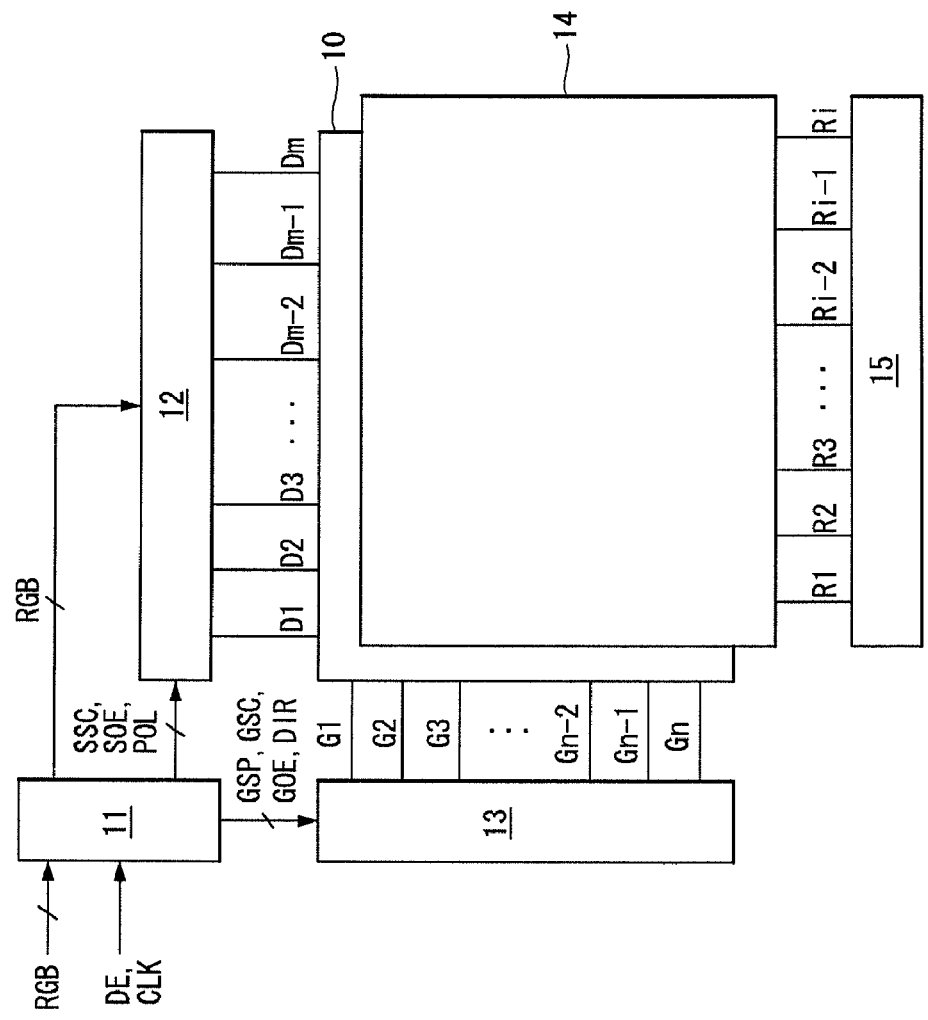
FIG. 1 is a block diagram illustrating a touch sensing device and a display device according to an embodiment of the disclosure.
Figure 2:
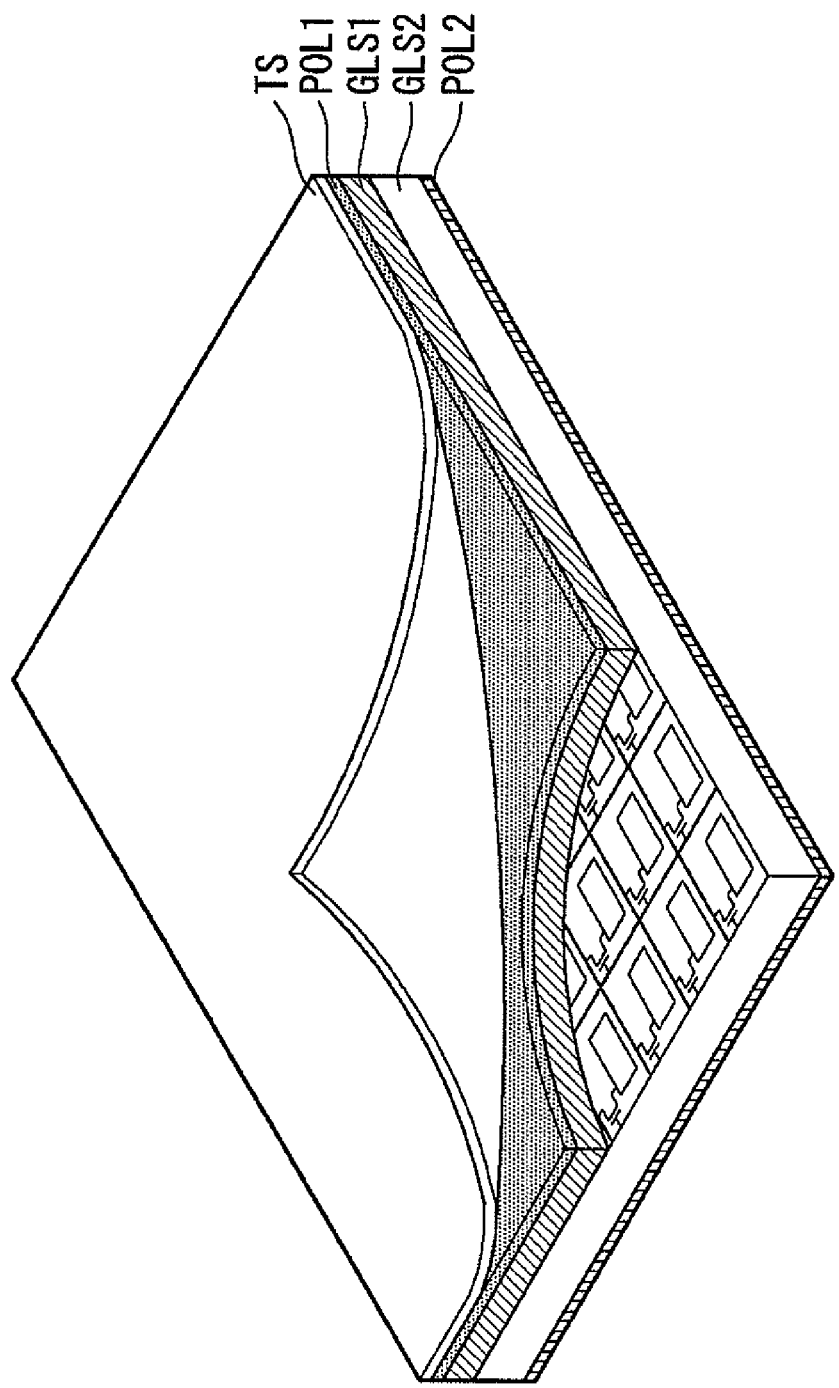
FIGS. 2 to 4 illustrate various exemplary configurations between touch sensors and a display panel.
Figure 3:
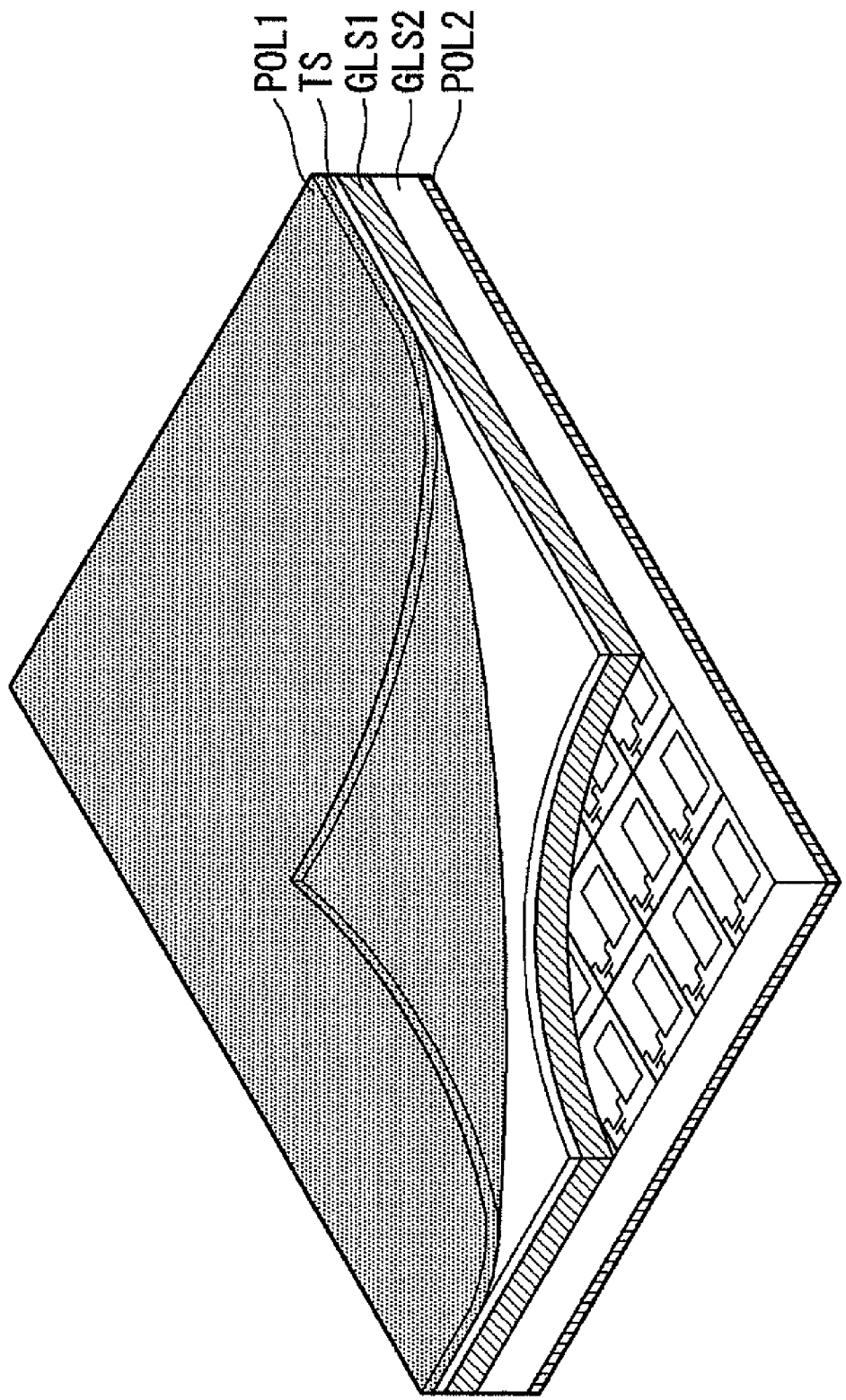
Figure 4:
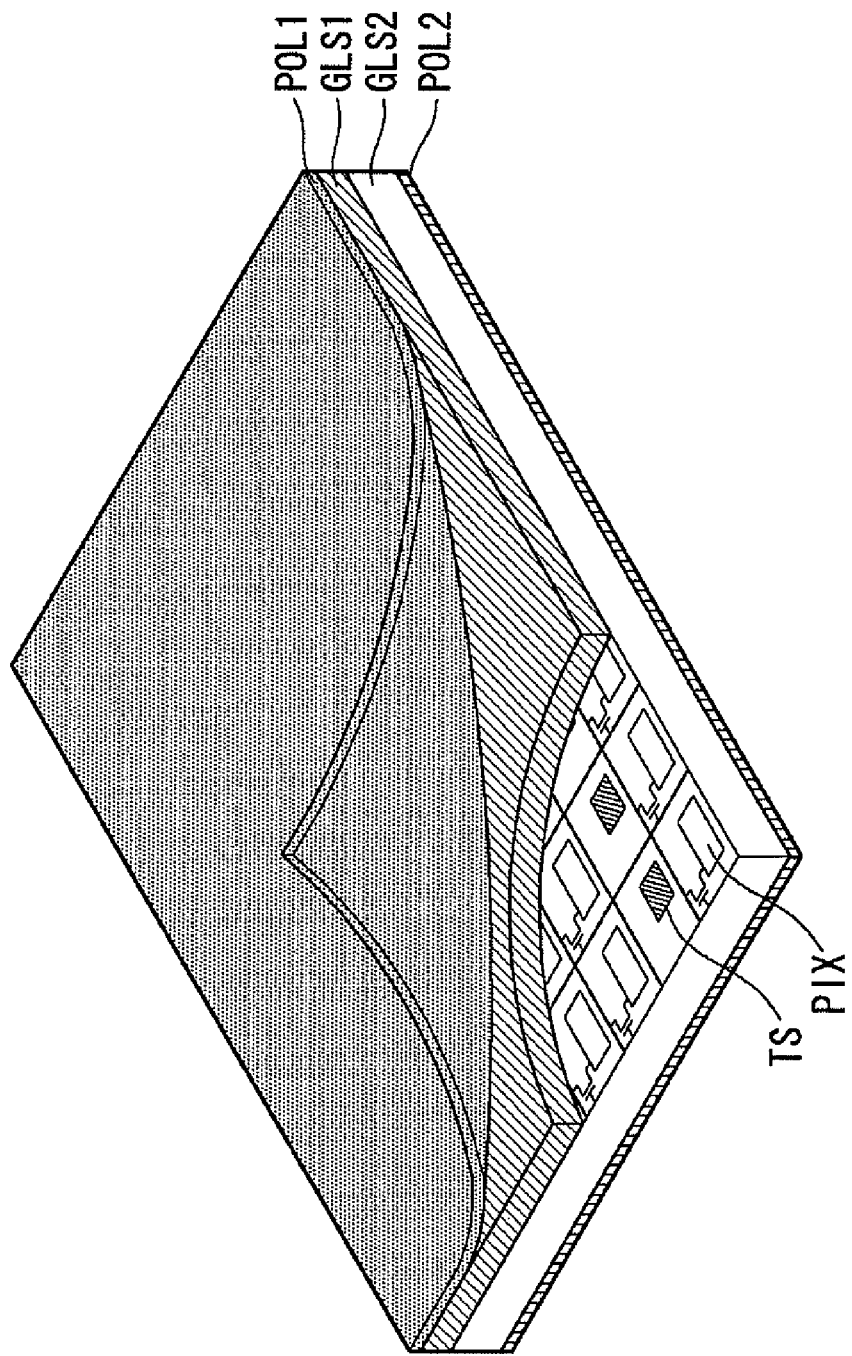

FIGS. 2 to 4 illustrate various exemplary configurations between the touch sensors and the display panel 10.

As shown in FIG. 2, the touch sensor array 14 may include a touch sensor TS stacked on the upper polarizing plate POL1 of the display panel 10. As shown in FIG. 3, the touch sensor array 14 may be mounted inside the display panel 10 and may include a touch sensor TS interposed between the upper polarizing plate POL1 and the upper glass substrate GLS1. The touch sensor array 14 shown in FIGS. 2 and 3 may be implemented as a resistance layer type touch sensor, a capacitance type touch sensor, a surface acoustic wave (SAW) type touch sensor, or an infrared type touch sensor.

As shown in FIG. 4, the touch sensor array 14 may include a plurality of touch sensors TS formed inside the pixel array of the display panel 10. The pixel array of the display panel 10 is formed on the lower glass substrate GLS2 and includes the data lines D1 to Dm, the gate lines G1 to Gn, pixel switching TFTs, the storage capacitor Cst, the pixel electrodes 1, and the like. Each of the touch sensors TS shown in FIG. 4 may include a TFT and a capacitor for detecting a sensor voltage.

The TFT of the touch sensor TS and the pixel switching TFTs of the pixel array are simultaneously formed, and the capacitor of the touch sensor TS and the storage capacitor Cst are simultaneously formed.

Figure 6:
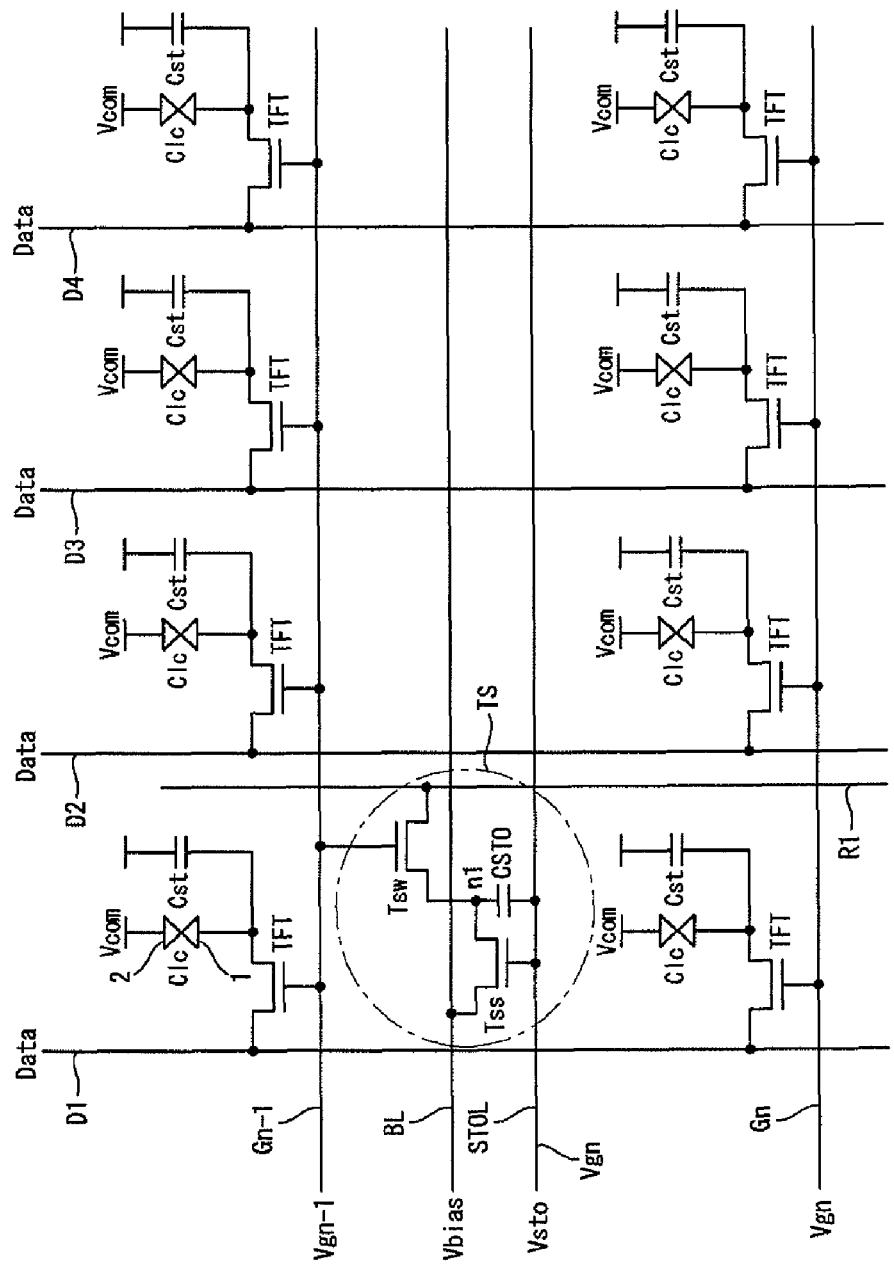
FIG. 6 is an equivalent circuit diagram illustrating an exemplary structure of touch sensors mounted inside a pixel array of a display panel.

FIGS. 5 to 7 illustrate the touch sensors mounted inside the pixel array of the display panel 10 and the TSIC. The touch sensors mounted inside the pixel array are not limited to examples illustrated in FIGS. 5 to 7 and may be embodied in many different forms.

As shown in FIGS. 5 to 7, each of the touch sensors TS may include a sensor TFT Tss, a storage capacitor CSTO, and a switching TFT Tsw.

The sensor TFT Tss opposes a transparent window W of the upper glass substrate GLS1. A gate electrode of the sensor TFT Tss is connected to a storage reference voltage line STOL and one terminal of the storage capacitor CSTO. A drain electrode of the sensor TFT Tss is connected to a bias voltage supply line BL receiving a bias voltage Vbias, and a source electrode of the sensor TFT Tss is connected to the other terminal of the storage capacitor CSTO and a drain electrode of the switching TFT Tsw via a first node n1. If a touch object such as a user's finger or a stylus pen is placed on the upper glass substrate GLS1 opposite the sensor TFT Tss, light from the backlight unit BLU is transmitted by the lower glass substrate GLS2, the liquid crystal layer, and the upper glass substrate GLS1, is reflected by the touch object, and is incident on a semiconductor layer of the sensor TFT Tss. The sensor TFT Tss generates a current depending on an amount of light incident on the semiconductor layer of the sensor TFT Tss.

While the switching TFT Tsw is turned off, the storage capacitor CSTO is charged to the current generated by the sensor TFT Tss. Then, when the switching TFT Tsw is turned on, the storage capacitor CSTO is discharged.

The switching TFT Tsw opposes the black matrix BM of the upper glass substrate GLS1, so that light is not irradiated to the switching TFT Tsw. The switching TFT Tsw is turned on in response to the scan pulse from the gate lines G1 to Gn. The switching TFT Tsw supplies a voltage discharged by the storage capacitor CSTO to the readout lines R1 to Ri. A gate electrode of the switching TFT Tsw is connected to the gate lines G1 to Gn. A drain electrode of the switching TFT Tsw is connected to the source electrode of the sensor TFT Tss and the other terminal of the storage capacitor CSTO via the first node n1, and a source electrode of the switching TFT Tsw is connected to the readout lines R1 to Ri.

The TSIC shown in FIG. 7 is only an example of the touch signal processing circuit 15 connected to the touch sensor TS shown in FIG. 6 and thus is not limited thereto. Accordingly, the TSIC may be embodied in many different forms including a TFT and a storage capacitor. The TSIC shown in FIG. 7 is connected to the readout lines R1 to Ri. The TSIC includes an operational amplifier OPamp, first and second output switching elements SH0 and SH1, an output buffer, an analog-to-digital convertor (ADC), etc. A reset switching element SRT and a feedback capacitor Cfb are connected to a noninverting input terminal and an output terminal of the operational amplifier OPamp. A reference voltage V0 of 2V is supplied to an inverting terminal of the operational amplifier OPamp. The operational amplifier OPamp differentially amplifies an output from the readout lines R1 to Ri and the reference voltage to supply them to the first and second output switching elements SH0 and SH1. Before the switching TFT Tsw is turned on, the first output switching element SH0 is turned on and thus outputs the reference voltage V0. After the switching TFT Tsw is turned on, the second output switching element SH1 is turned on and thus outputs a touch sensor output voltage V1 input through the readout lines R1 to Ri. The TSIC converts a differential voltage between the reference voltage V0 and the touch sensor output voltage V1 into digital data using the ADC to transmit the digital data to a control board 50.

FIGS. 8 and 9 illustrate an experimental device of touch data connected to the touch sensing device and a touch data correction circuit.

As shown in FIGS. 8 and 9, the control board 50 includes the timing controller 11 and a touch data correction circuit. The timing controller 11 supplies digital video data to the data drive circuit 12 and controls operation timing of each of the data drive circuit 12 and the scan drive circuit 13. Further, the timing controller 11 controls operation timing of the touch signal processing circuit 15.

The touch data correction circuit includes a data correction unit 61, a noise removing unit 62, and a coordinate detecting unit 63. The touch data correction circuit may be separated from the control board 50 and may be mounted inside each of the TSICs.

The data correction unit 61 generates mirror data for each of the TSICs among digital data output from each of the TSICs. The data correction unit 61 calculates a correction value of touch data of each of the TSICs using the mirror data and digital data adjacent to the mirror data and thus corrects a swing level of touch data and an output deviation between the TSICs. The data correction unit 61 calculates the number of correction values equal to or greater than a predetermined critical value. If the number of correction values is less than a predetermined reference value, the data correction unit 61 determines the correction values as an output of a defective touch sensor and removes the correction values. A predetermined offset value may be added to the correction values having the corrected swing level in the output deviation between the TSICs and the output of the touch sensors. The offset value is added to the correction values so that the corrected digital data is indicated with a positive integer. The offset value indicated with a positive integer may be experimentally determined and may be controlled depending on the touch sensitivity setting.

The noise removing unit 62 removes noise mixed in outputs of the touch sensors using a well-known noise removing algorithm. The coordinate detecting unit 63 detects digital data equal to or greater than a predetermined threshold value among the digital data, that undergoes the correction of the output deviation between the TSICs, the correction of the swing level, and the noise removal, as an effective touch position and calculates x-y coordinate value of the effective touch position.

An experimental device of touch data includes an interface board 51 connected to the control board 50, a computer 52, and a monitor 53. The experimental device of touch data is a device capable of seeing operations and sensibility of the touch sensors through the human' eye. For this, the experimental device converts output singles of the touch sensors into image signals and displays the image signals on the monitor 53. Accordingly, the experimental device of touch data may be separated from the control board 50 after the touch sensing device and the display device are completed. The interface board 51 transfers the touch data and the coordinate values obtained from the touch data correction circuit to the computer 52 using an interface, such as serial peripheral interface (SPI), RS232, and I2C. The interface board 51 is inserted into a peripheral component interconnect (PCI) slot of the computer 52. The computer 52 supplies touch data input through the PCI slot to the monitor 53, and the monitor 53 displays the touch data supplied by the computer 52.

Figure 10A:
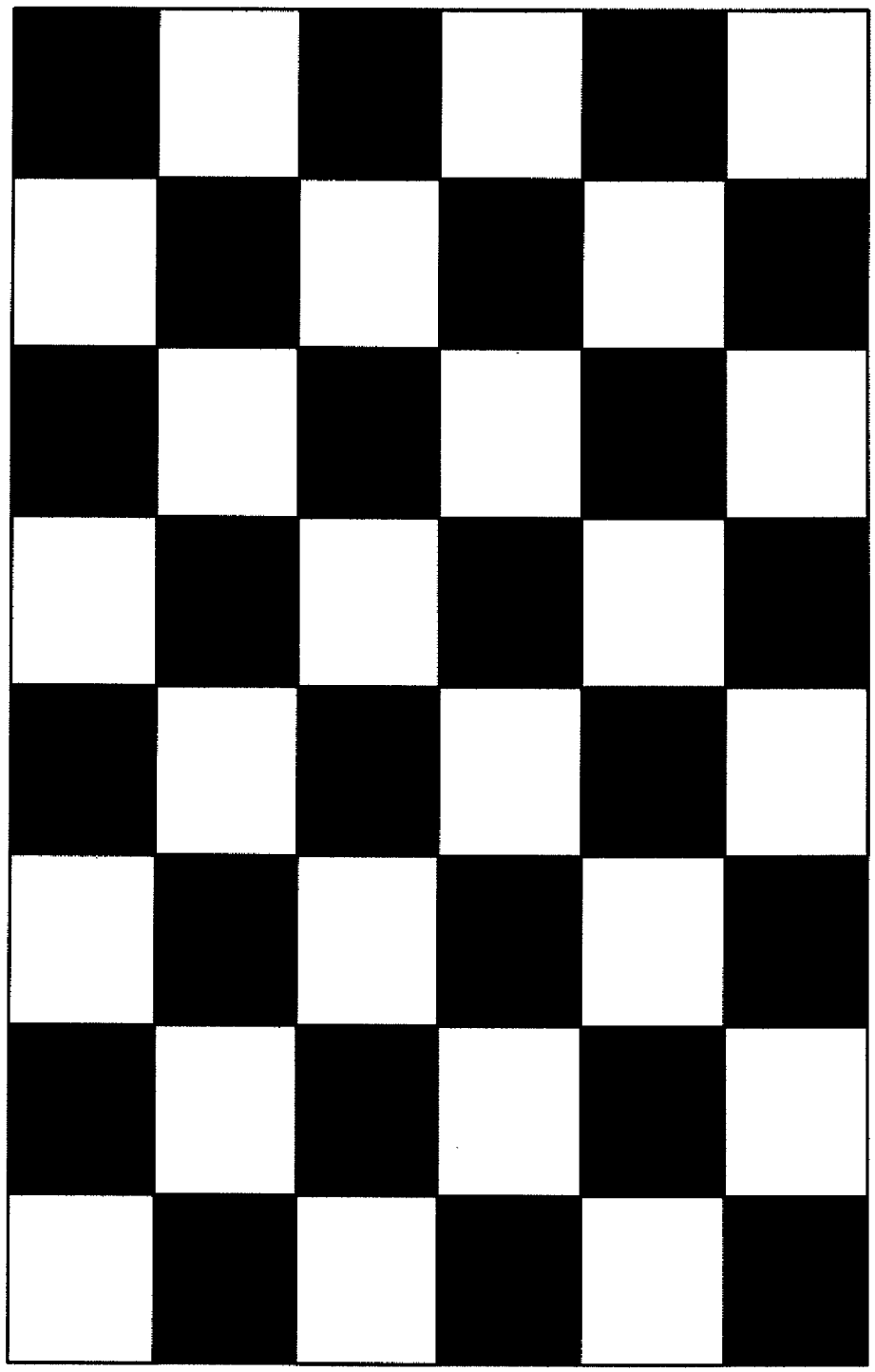
FIG. 10A illustrates an example of test data displayed on a display panel.
Figure 10B:
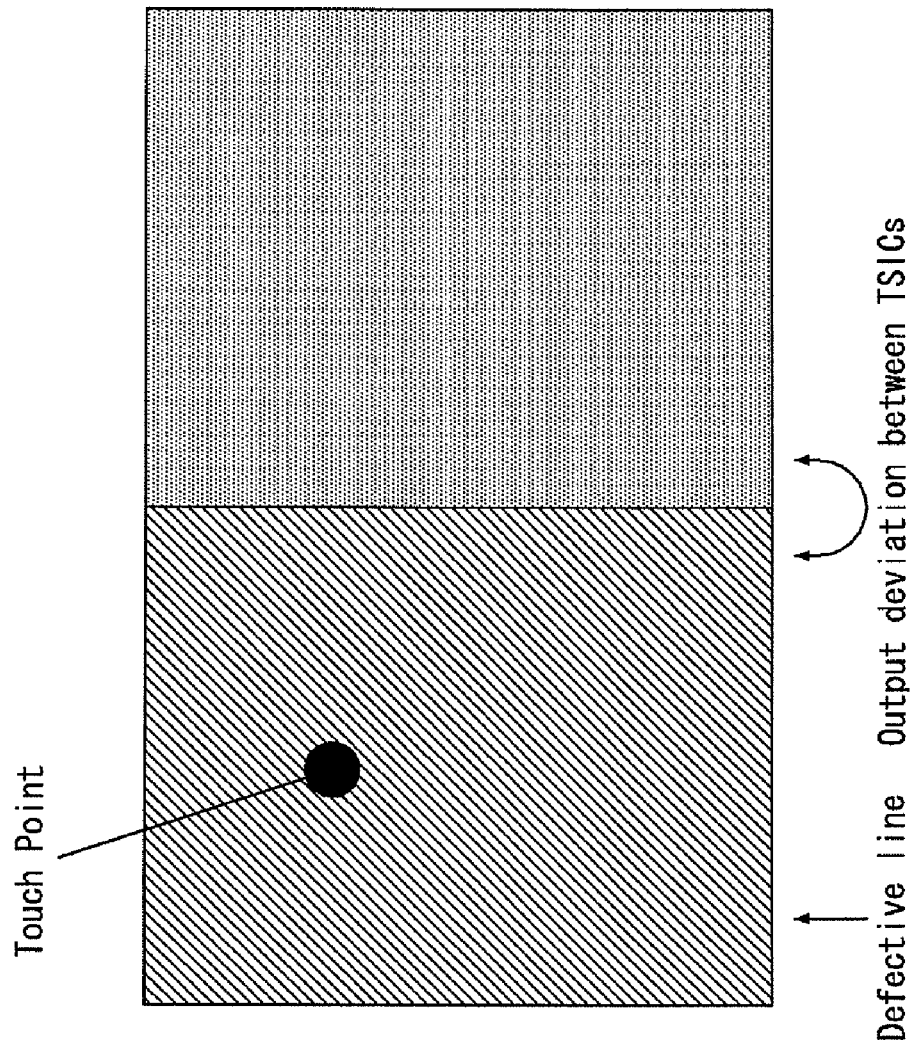
FIG. 10B is a captured photograph of an output image of a touch sensor displayed on an experimental device when touch data is displayed on a display panel.
Figure 11:
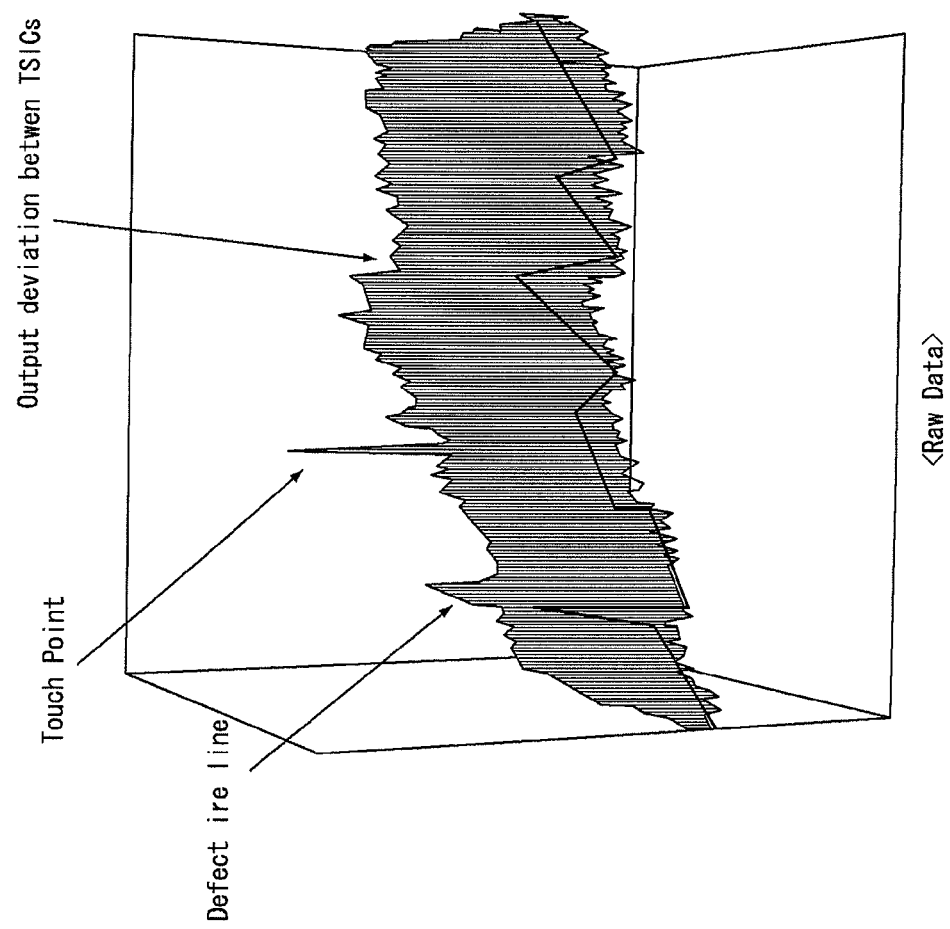
FIG. 11 is a three-dimensional graph image showing output levels of touch sensors.
Figure 12:
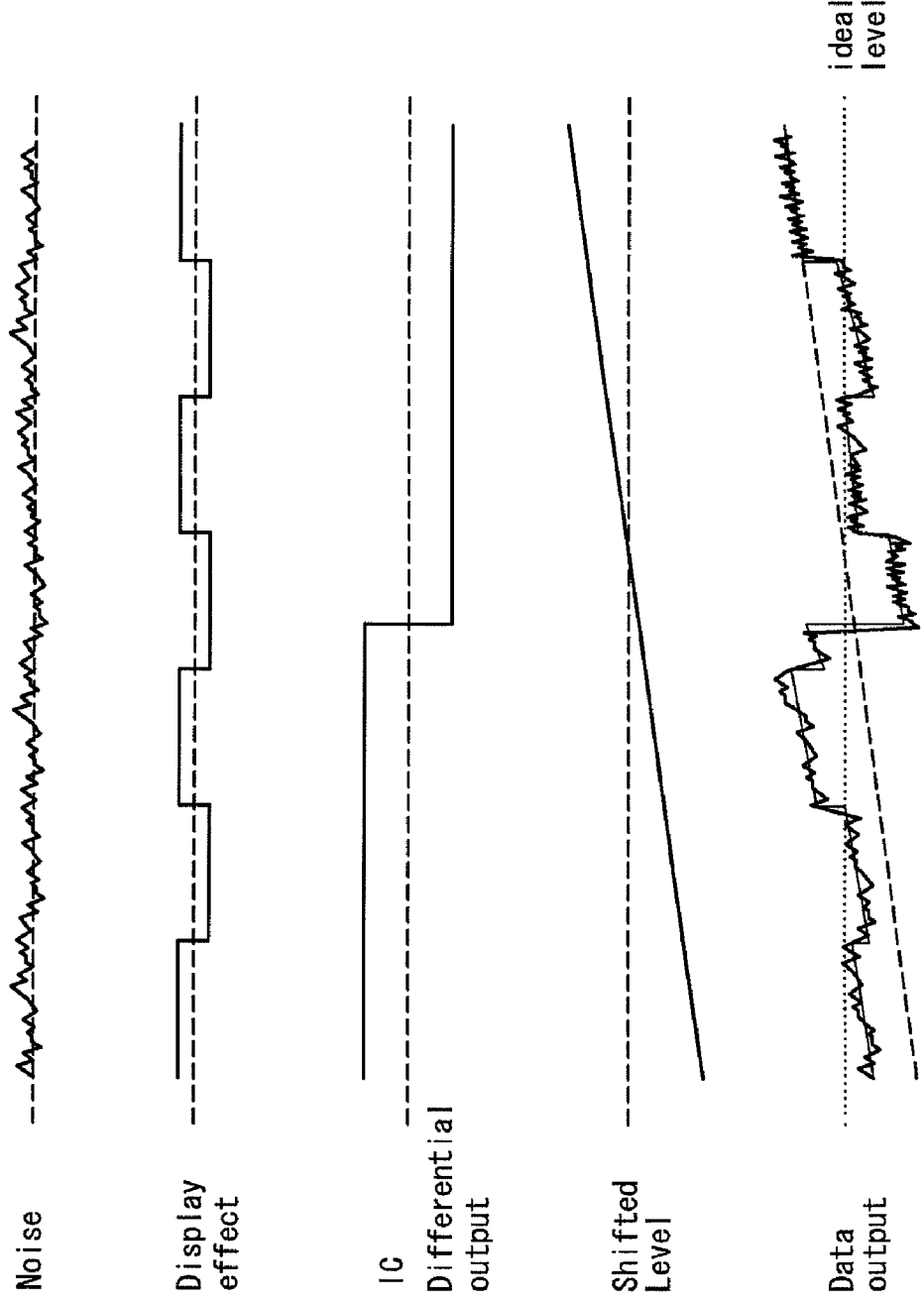
FIG. 12 is a waveform diagram illustrating a noise included in an output of touch sensors and a deviation between TSICs.

FIG. 10A illustrates an example of test data displayed on the display panel 10. FIG. 10B is a captured photograph of an output image of the TSICs displayed on the monitor 53 when the test data illustrated in FIG. 10A is displayed on the display panel 10. In the test data, white patterns of the uniform size and black patterns of the uniform size alternate with each other in vertical and horizontal directions. When the test data is displayed on the display panel 10, as shown in FIG. 10B, a noise, in which the patterns of the test data look like image sticking, appears in an output of the TSICs because of an electrical coupling between the display panel 10 and the touch sensor array 14. Further, as shown in FIG. 10B, output levels of neighboring TSICs are different from each other because of a deviation between the neighboring TSICs. In FIG. 10B, 'defected line' indicates a line in which a defective output of the touch sensor is generated. FIG. 11 is a three-dimensional graph image showing output levels of the touch sensors. As shown in FIGS. 10B and 11, much noise is mixed in an output of the touch sensors, and thus there is a relatively large output deviation between the TSICs because of the noise of the touch sensors. In other words, as shown in FIG. 12, a data output of the touch sensors includes a noise component, a coupling component resulting from an image displayed on the display panel 10, the deviation between the TSICs, and the swing level. Thus, the sensibility and accuracy of the touch sensors are reduced because of the data output.

Figure 13:
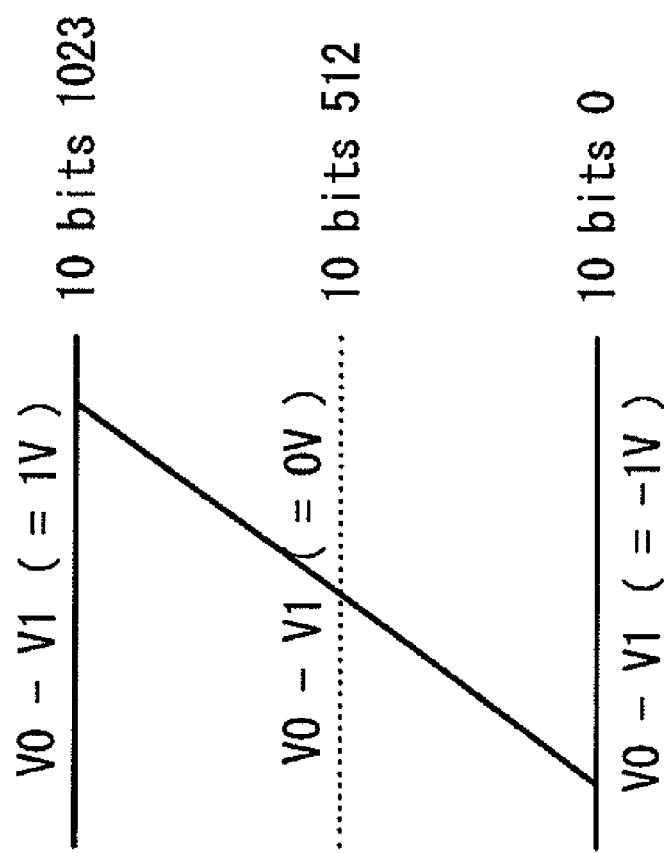
FIG. 13 illustrates voltages and digital values of touch data.
Figure 14:
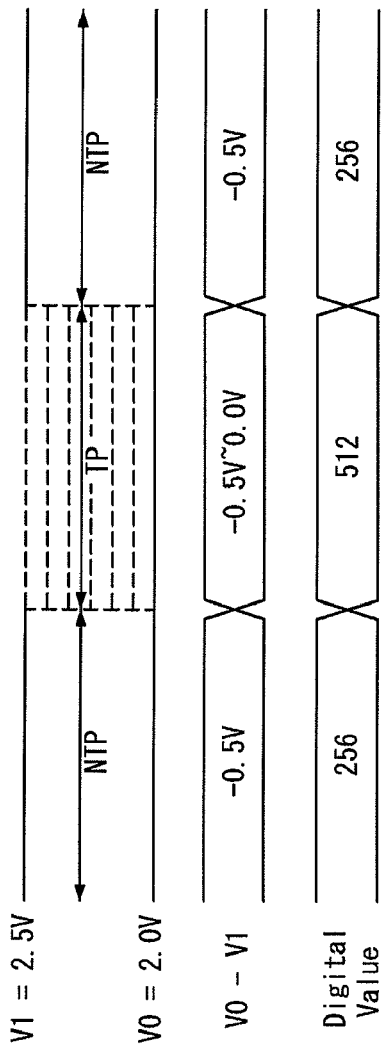
FIG. 14 illustrate voltages and digital values of touch data in a touch period and voltages and digital values of touch data in a non-touch period.

FIGS. 13 and 14 illustrate changes in touch data in a non-touch period NTP where a touch input is not applied to the touch sensor array 14 and changes in touch data in a touch period TP where a touch input is applied to the touch sensor array 14.

As shown in FIGS. 13 and 14, the touch signal processing circuit 15 converts a differential voltage (V0−V1) between a predetermine reference voltage V0 and an output voltage V1 of the touch sensor into digital data (i.e., the touch signal processing circuit 15 performs analog-to-digital conversion) to generate touch data. If a reference voltage V0 of 2.0V and a touch sensor output voltage V1 of 2.5V are generated during the non-touch period NTP, the touch signal processing circuit 15 converts a differential voltage (V0−V1) of −0.5V into a digital value '256' to generate an output of the touch sensor. Because the touch sensor output voltage V1 varies depending on a touch pressure during the non-touch period NTP, the touch signal processing circuit 15 generates a differential voltage (V0−V1) between −0.5V and 0.0V as a digital value between '256' and '512'.

FIGS. 15 to 18 illustrate a first exemplary method for generating mirror data of the data correction unit 61. Mirror data is selected among touch data of 1 line simultaneously output by the touch sensors of the touch sensor array 14. The touch data of 1 line is raw data before undergoing the correction and is digital data converted by the TSIC. The mirror data is pseudo data. A differential operation will be performed between the mirror data and touch data output from a touch sensor positioned at one edge or the other edge of the touch sensor array 14. The touch data of 1 line simultaneously output by the touch sensor array 14 is corrected along a uniform direction from an output of the touch sensor positioned at one edge of the touch sensor array 14 to an output of the touch sensor positioned at the other edge of the touch sensor array 14. The output of the touch sensor positioned at one edge of the touch sensor array 14, or the output of the touch sensor positioned at the other edge of the touch sensor array 14 is corrected using a differential operation result between the mirror data and the touch data of the touch sensor.

Each of the TSICs of the touch signal processing circuit 15 generates a differential voltage between a voltage V1 of touch data input by the touch sensor and a predetermined reference voltage V0 and converts the differential voltage into digital data using the ADC. In the first exemplary method, as shown in FIGS. 15 to 18, the data correction unit 61 selects the mirror data among raw data 1st RD, 2nd RD, . . . , Nth RD being digital data in consideration of the following 4 cases.

Figure 15:
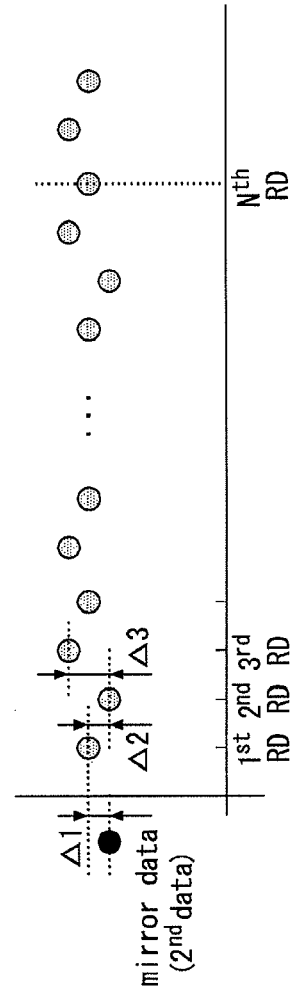
FIGS. 15 to 18 illustrate a first exemplary method for generating mirror data.

Case 1 (FIG. 15)

When the following equations are calculated: 2nd RD−1st RD=Δ2, 3rd RD−2nd RD=Δ3, . . . , and Nth RD−(N−1)th RD=ΔN (where N is a positive integer), if all of Δ2, Δ3, . . . , and ΔN do not exceed a predetermined reference value, the data correction unit 61 selects the second raw data 2nd RD, whose external conditions are most similar to the first raw data 1st RD, as mirror data. The predetermined reference value is a positive integer value obtained through an experiment. The first raw data 1st RD is an output of a first touch sensor positioned at a left-hand edge of the touch sensor array 14 among the raw data simultaneously output by the touch sensor array 14 in a predetermined line. The second raw data 2nd RD is an output of a second touch sensor on the right of the first touch sensor. The Nth raw data Nth RD is an output of an Nth touch sensor.

Figure 16:
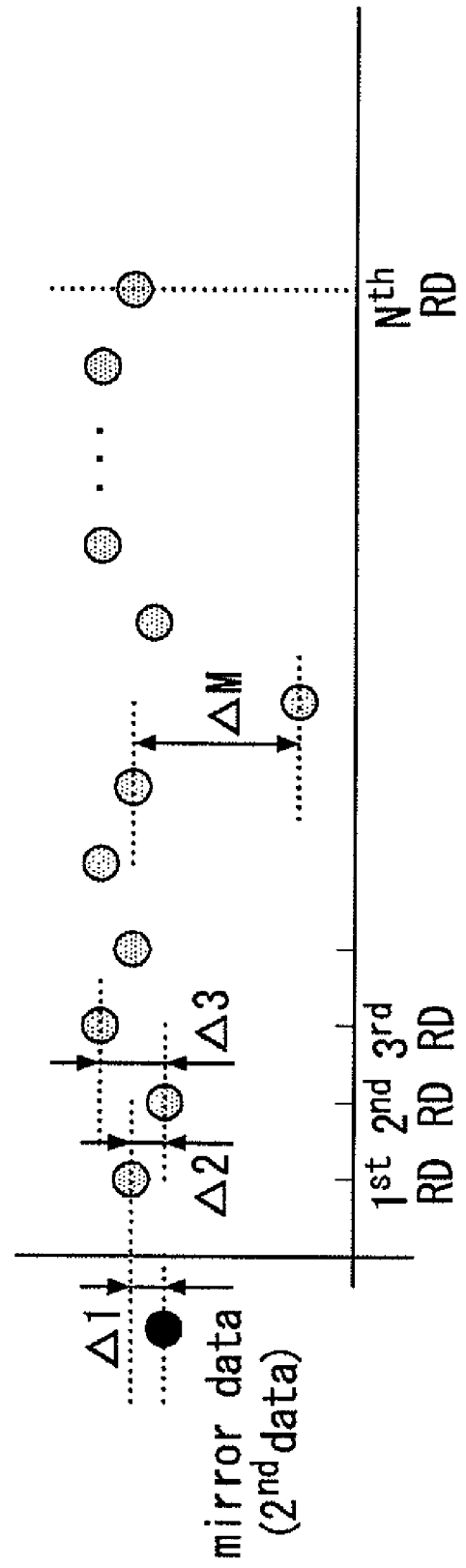
Figure 17:
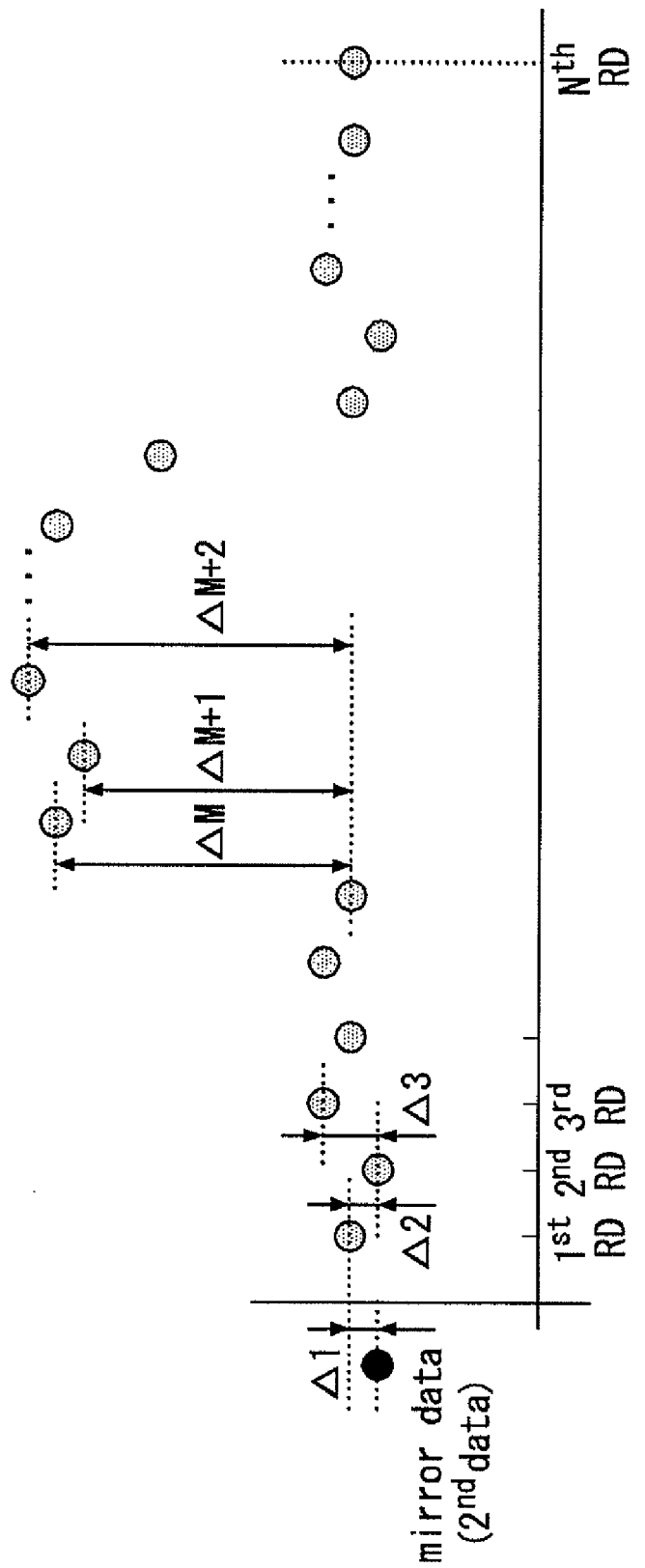

Case 2 (FIG. 16)

When the following equations are calculated: 2nd RD−1st RD=Δ2, 3rd RD−2nd RD=Δ3, . . . , Mth RD−(M−1)th RD=ΔM (where M is a positive integer less than N), . . . , and Nth RD−(N−1)th RD=ΔN, if there exists a differential value (i.e., ΔM) exceeding a predetermined reference value, the data correction unit 61 compares the number of differential values exceeding the reference value with an allowable reference number. When the number of differential values exceeding the reference value is less than the allowable reference number, the data correction unit 61 neglects the differential value exceeding the reference value and selects the second raw data 2nd RD, whose external conditions are most similar to the first raw data 1st RD, among raw data generating the differential values less than the reference value as the mirror data. The reference value and the allowable reference number are experimentally obtained values and may vary depending on the touch sensors existing in a raw data extracting line or the sensitivity setting of the touch sensors.

Figure 19:
FIG. 19 illustrates the number of usable channels in each of TSICs.

Case 3 (FIG. 19)

When the following equations are calculated: 2nd RD−1st RD=Δ2, 3rd RD−2nd RD=Δ3, . . . , Mth RD−(M−1)th RD=ΔM, (M+1)th RD−(M−1)th RD=ΔM+1, (M+2)th RD−(M−1)th RD=ΔM+2, . . . , and Nth RD−(N−1)th RD=ΔN, if there exist successively a plurality of differential values (i.e., ΔM, ΔM+1, ΔM+2) exceeding a predetermined reference value, the data correction unit 61 compares the number of differential values exceeding the reference value with an allowable reference number. When the number of differential values exceeding the reference value is less than the allowable reference number, the data correction unit 61 neglects the differential values exceeding the reference value and selects the second raw data 2nd RD, whose external conditions are most similar to the first raw data 1st RD, among raw data generating the differential values less than the reference value as the mirror data. This case is a case that an area of the touch data is not considered as a touch area because the number of touch data exceeding the reference value is small.

Figure 18:
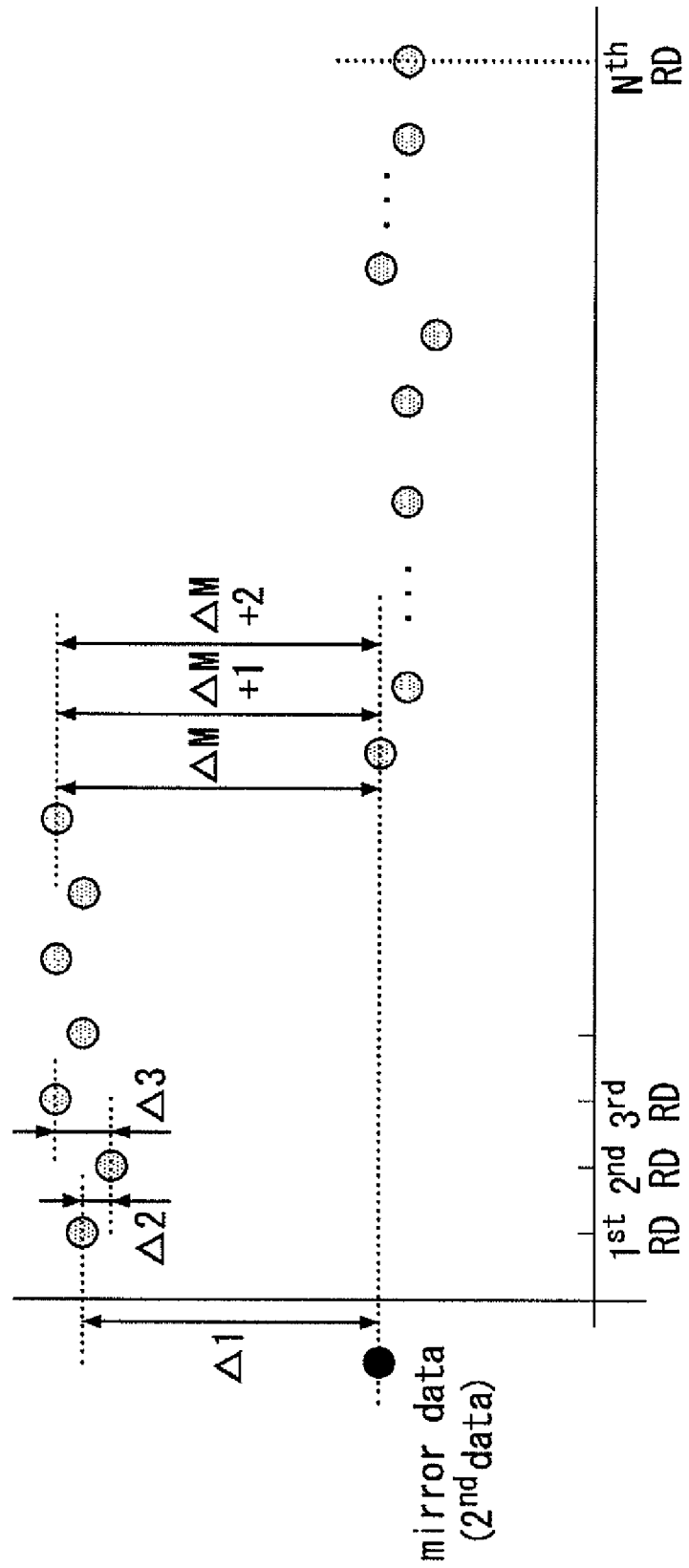

Case 4 (FIG. 18)

When the following equations are calculated: 2nd RD−1st RD=Δ2, 3rd RD−2nd RD=3, . . . , Mth RD−(M−1)th RD=ΔM, (M+1)th RD−Mth RD=ΔM+1, (M+2)th RD−Mth RD=M+2, . . . , and Nth RD−(N−1)th RD=ΔN, if there exist successively a plurality of differential values (i.e., ΔM, ΔM+1, ΔM+2), indicated with a negative number, exceeding a predetermined reference value, the data correction unit 61 compares the number of differential values exceeding the reference value with an allowable reference number. When the number of differential values exceeding the reference value is equal to or greater than the allowable reference number, the data correction unit 61 determines an area around the first touch sensor as a area of an actual touch input and selects the Mth raw data Mth RD, whose external conditions are most similar to the 1st raw data 1st RD, among raw data as the mirror data.

FIG. 19 illustrates first to third TSICs connected to output terminals of the touch sensor array 14.

As shown in FIG. 19, the number of usable channels of a first TSIC TSIC #1 is N1, and the first TSIC TSIC #1 receives 1st RD to N1$th$ RD among raw data of 1 line simultaneously output from the touch sensor array 14 and converts the 1st RD to N1$th$ RD into digital data. The number of usable channels of a second TSIC TSIC #2 is N2, and the second TSIC TSIC #2 receives (N1+1)th RD to (N1+N2)th RD among the raw data of 1 line simultaneously output from the touch sensor array 14 and converts the (N1+1)th RD to (N1+N2)th RD into digital data. The number of usable channels of a third TSIC TSIC #3 is N3, and the third TSIC TSIC #3 receives (N1+N2+1)th RD to (N1+N2+N3)th RD among the raw data of 1 line simultaneously output from the touch sensor array 14 and converts the (N1+N2+1)th RD to (N1+N2+N3)th RD into digital data. The number of usable channels of each of the first to third TSICs TSIC #1, TSIC #2, and TSIC #3 may vary depending on the number of touch sensors and a resolution.

Figure 20:
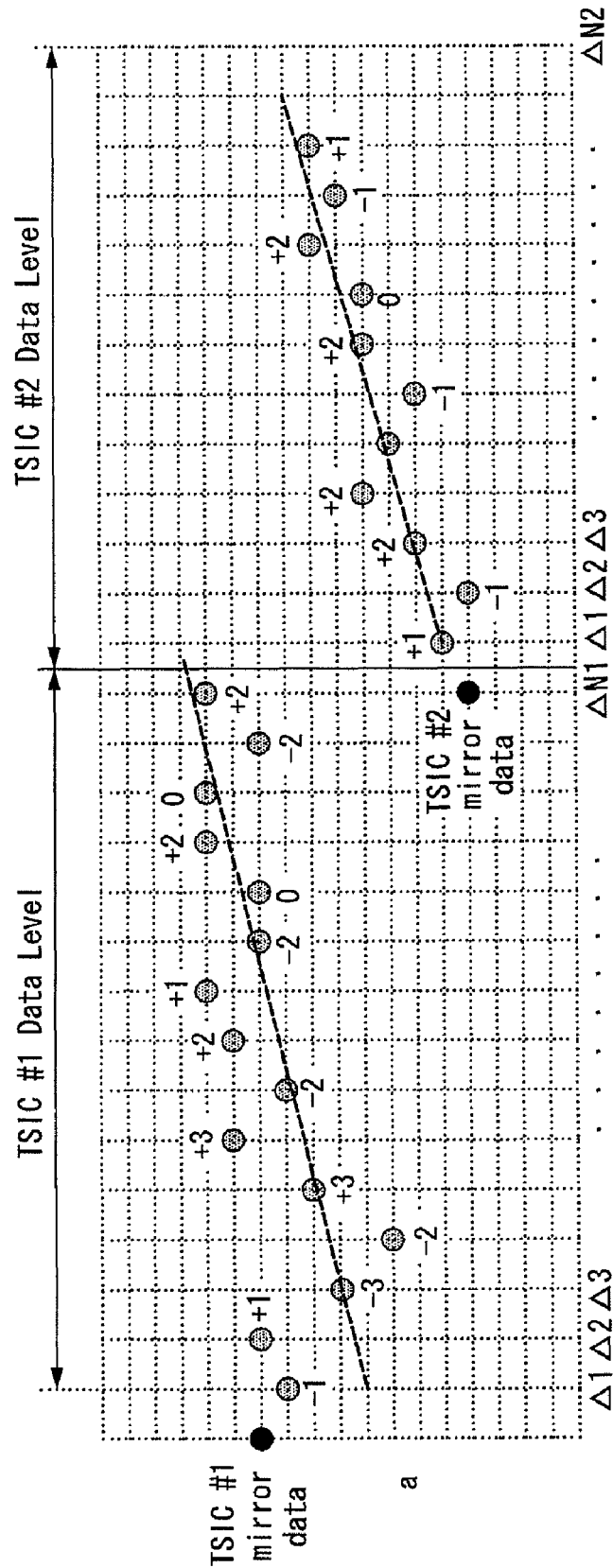
FIGS. 20 and 21 illustrate correction values of touch data and mirror data.
Figure 21:
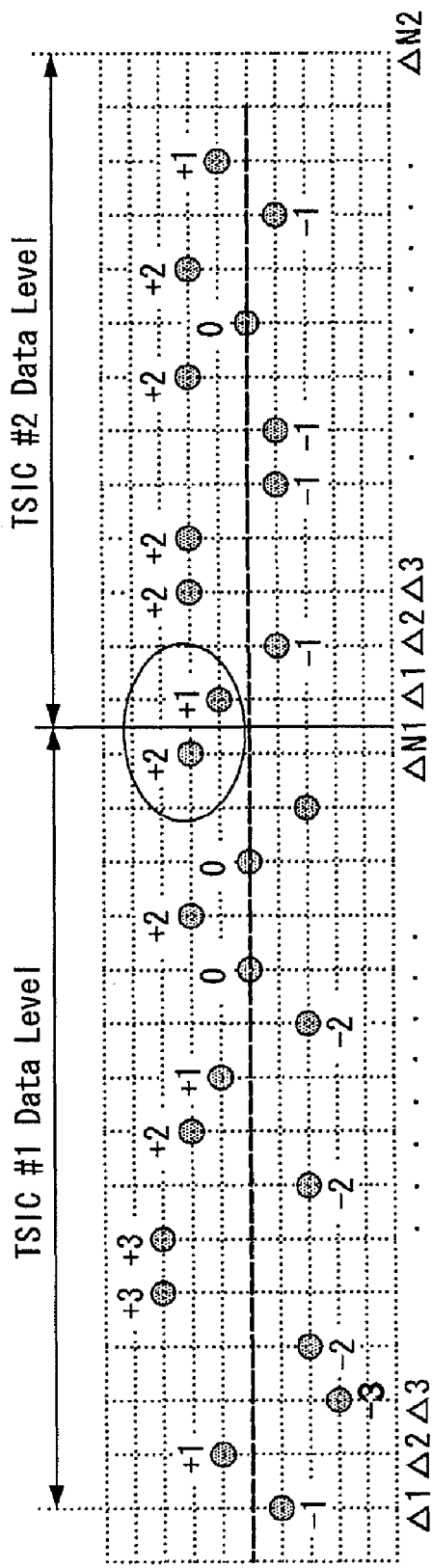

FIG. 20 illustrates correction values obtained by performing a differential operation illustrated in FIGS. 15 to 18 on the touch data of FIGS. 10B and 11. In FIG. 20, "TSIC #1 mirror data" is mirror data of a first TSIC selected using the method illustrated in FIG. 15, and "TSIC #2 mirror data" is mirror data of a second TSIC selected using the method illustrated in FIG. 15. The data correction unit 61 calculates a correction value $\Delta 1$ of first raw data received from the first TSIC through the following equation: $\Delta 1$=1st RD−TSIC #1 mirror data. Then, the data correction unit 61 calculates a correction value $\Delta N1$ of each of second to N1$th$ raw data received from the first TSIC through the following equation: $\Delta N1$=N1$th$ RD−(N1−1)th RD. The data correction unit 61 calculates a correction value $\Delta 1$ of first raw data received from the second TSIC through the following equation: $\Delta 1$=1st RD−TSIC #2 mirror data. Then, the data correction unit 61 calculates a correction value $\Delta N2$ of each of second to N2$th$ raw data received from the second TSIC through the following equation: $\Delta N2$=N2$th$ RD−(N2−1)th RD. As a result, as shown in FIG. 21, the raw data output from the first and second TSICs is corrected as a value close to a reference level indicated by dotted lines. As can be seen from the correction values illustrated in FIG. 21, a swing level component of the raw data and a deviation component between the TSICs are removed.

Figure 22:
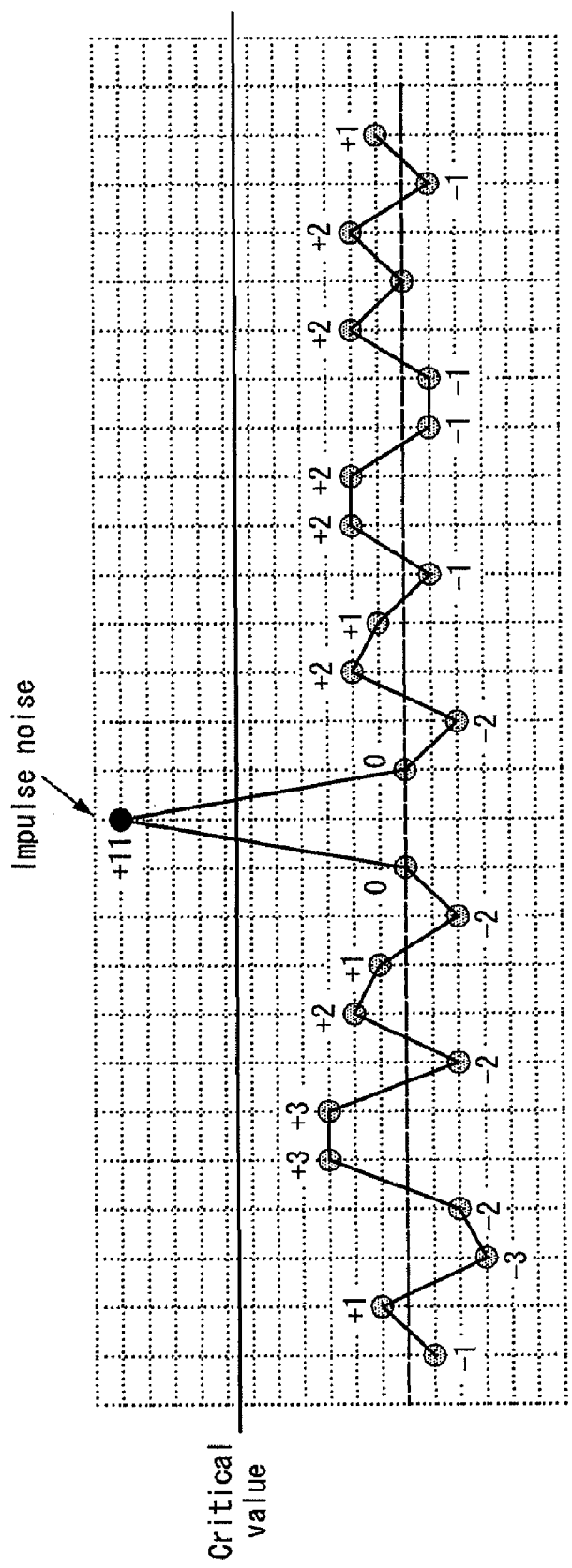
FIGS. 22 and 23 illustrate a method for correcting an output of a defective touch sensor.
Figure 23:
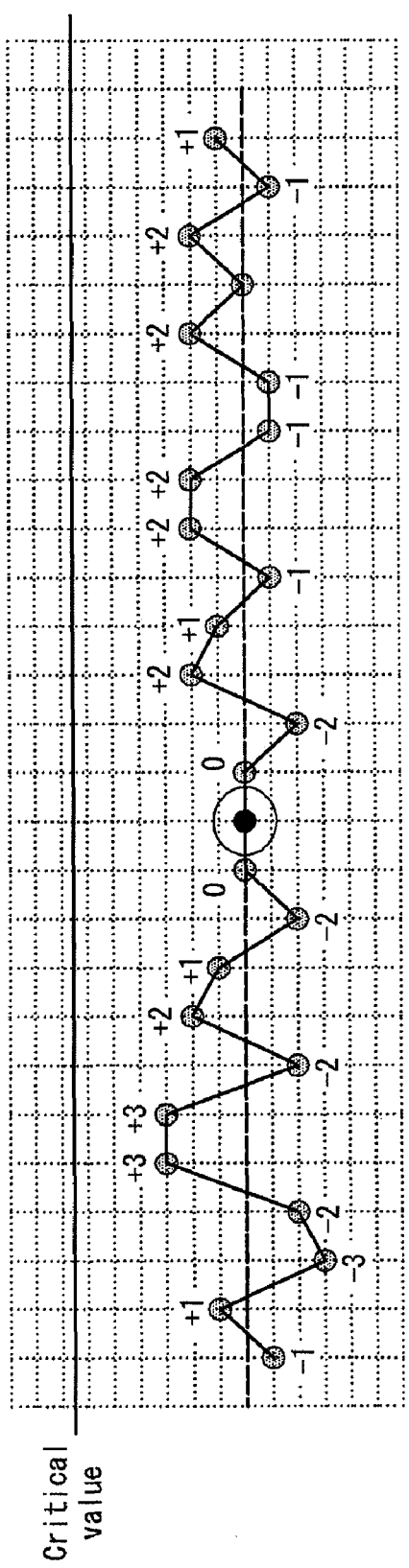

As shown in FIG. 22, the data correction unit 61 calculates the number of successive correction values of touch data equal to or greater than a predetermined critical value. If the number of successive correction values equal to or greater than the predetermined critical value is less than a predetermined reference value, the data correction unit 61 determines the correction value as an output of a defective touch sensor. The data correction unit 61 multiplies the correction value equal to or greater than the predetermined critical value by zero so as to remove the output of the defective touch sensor. As a result, the output of the defective touch sensor is removed as indicated by circle in FIG. 23. On the other hand, the data correction unit 61 multiplies the correction values less than the predetermined critical value by a weighted value of 1. If the number of successive correction values equal to or greater than the predetermined critical value is equal to or greater than the predetermined reference value, the data correction unit 61 multiplies successive correction values by a weighted value of 1. In this case, the correction values are considered as data of a touch area.

Figure 24:
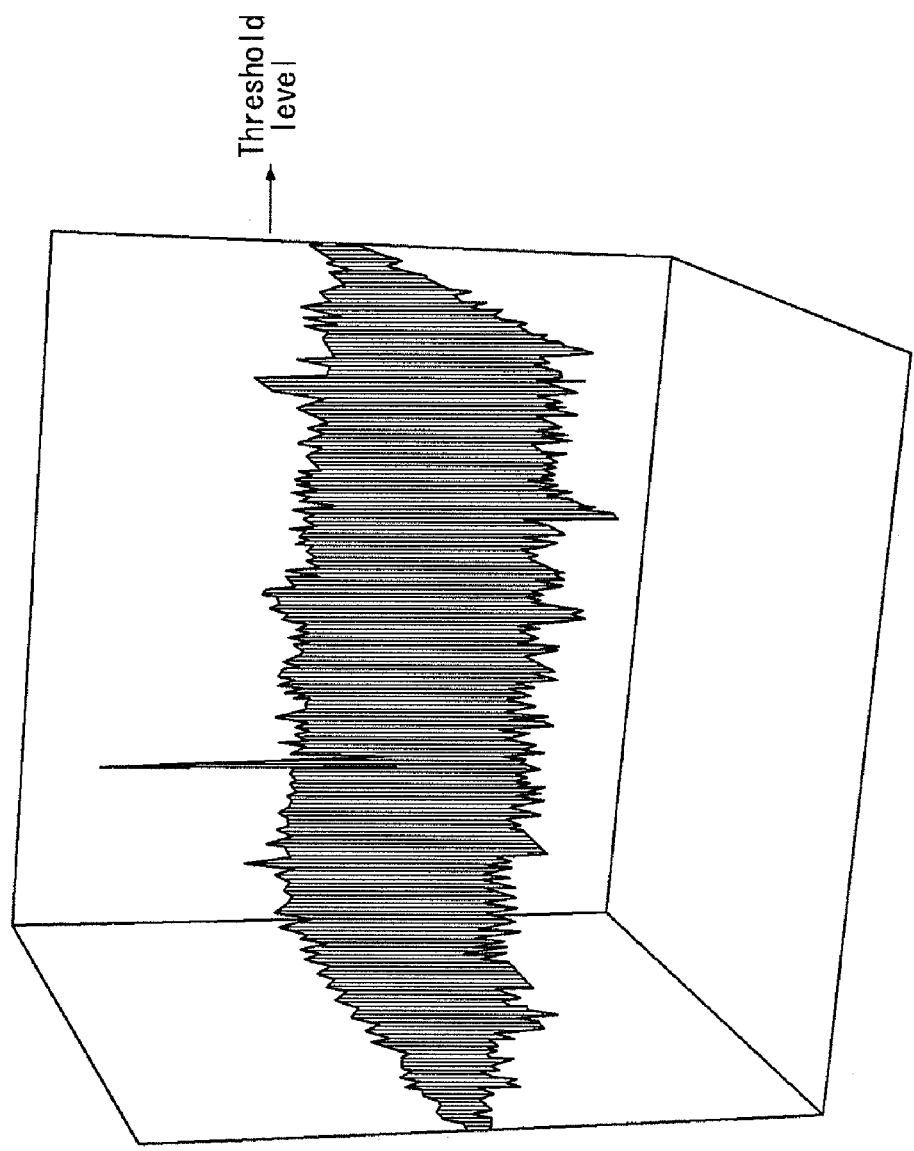
FIG. 24 is a three-dimensional graph image illustrating a result obtained by addling an offset value '512' to touch data of FIG. 11 corrected by a correction method illustrated in FIGS. 15 to 23.

FIG. 24 is a three-dimensional graph image illustrating a result obtained by addling an offset value '512' to each of the correction values corrected through the correction method illustrated in FIGS. 15 to 23. In FIG. 24, touch data equal to or greater than a predetermined critical value among corrected touch data is an output of the touch sensor in an actual touch area. As can be seen from FIG. 24, the noise, the swing level, and the deviation component between the TSICs included in the touch data of FIG. 11 are removed.

Figure 25:
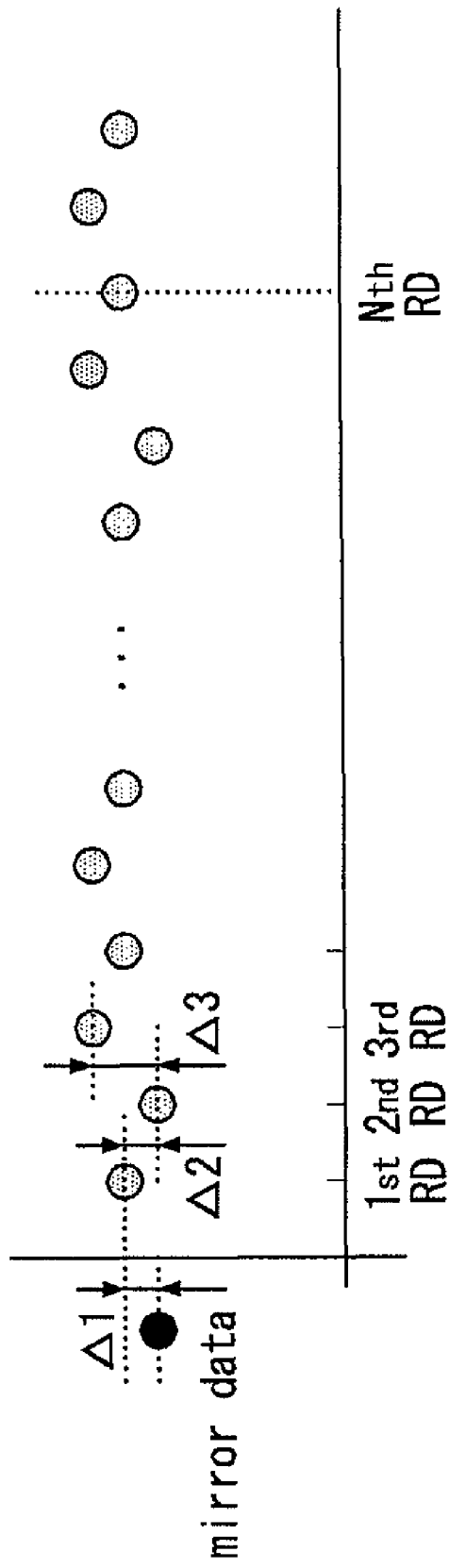
FIGS. 25 and 26 illustrate a second exemplary method for generating mirror data.
Figure 26:
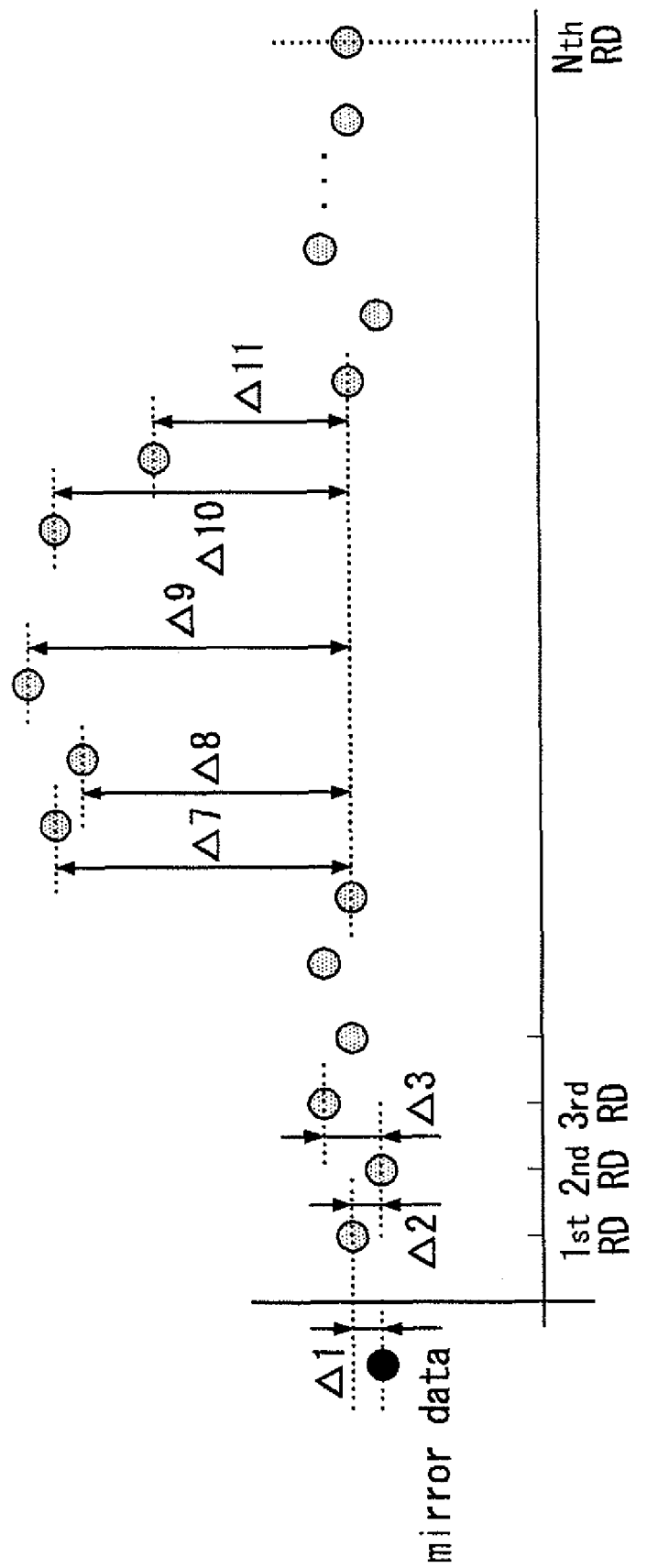

FIGS. 25 and 26 illustrate a second exemplary method for generating mirror data. In the second exemplary method, mirror data is calculated using an average value of raw data of 1 line output from the TSICs, and the raw data is corrected using a differential value between adjacent raw data obtained using the mirror data. The mirror data is calculated in each of the TSICs. Namely, the number of mirror data is equal to the number of TSICs.

Supposing that mirror data of the first TSIC TSIC #1 is MD1, mirror data of the second TSIC TSIC #2 is MD2, and mirror data of the third TSIC TSIC #3 is MD3, the mirror data MD1, MD2, and MD3 is calculated through the following equations: MD1=[SUM(1st RD to N1$th$ RD)]/N1, MD2={SUM[(N1+1)th RD to (N1+N2)th RD)]}/N2, MD3={SUM[(N1+N2+1)th RD to (N1+N2+N3)th RD)]}/N3. Namely, the mirror data is calculated using an average value of raw data.

Supposing that mirror data of the first TSIC is MD1 and mirror data of the second TSIC is MD2, the mirror data MD1 and MD2 is calculated using the above average value of raw data. First raw data 1st RD of the first TSIC is corrected as a value obtained by adding a differential value between the first mirror data MD1 and the first raw data 1st RD to an offset value, and first raw data 1st RD of the second TSIC is corrected as a value obtained by adding a differential value between the second mirror data MD2 and the first raw data 1st RD to an offset value. Raw data extracted from 1 line is corrected under the same conditions as FIGS. 25 and 26.

As shown in FIG. 25, if all of differential values between adjacent raw data including a differential value between mirror data and first raw data 1st RD do not exceed a predetermined critical value, correction values $\Delta 1, \Delta 2, \ldots, \Delta N$ are calculated as a differential value between the adjacent raw data as indicated by the following equations: $\Delta 1$=MD1 (or MD2)−1st RD, $\Delta 2$=2nd RD−1st RD, . . . , and $\Delta N$=Nth RD−(N−1)th RD.

As shown in FIG. 26, if at least one differential value between adjacent raw data exceeds a predetermined critical value, differential values equal to or less than the predetermined critical value are calculated as a differential value between the adjacent raw data as indicated by the following equations: $\Delta 1$=MD1 (or MD2)−1st RD, $\Delta 2$=2nd RD−1st RD, . . . , $\Delta 6$=6th RD−5th RD. On the other hand, differential values exceeding the predetermined critical value are calculated by the following equations: $\Delta 7$ (exceeding the critical value)=7th RD−6th RD, $\Delta 8$ (no update)=8th RD−6th RD, $\Delta 9$ (no update)=9th RD−6th RD, . . . , $\Delta 12$ (equal to or less than the critical value)=12th RD−6th RD, $\Delta 13$=13th RD−12th RD.

As above, if there exist the differential values exceeding the predetermined critical value, equalization reference data is not updated until each of the differential values is equal to or less than the critical value. The equalization reference data is raw data immediately prior to raw data generating the differential value exceeding the predetermined critical value. In FIG. 26, equalization reference data is 6th RD.

FIG. 27 illustrates an example of calculating mirror data MD using average values between raw data 1st RD to 8th RD. FIG. 28 illustrates a first correction value Δ1 of the first raw data 1st RD calculated using a differential value between the mirror data MD of FIG. 27 and the first raw data 1st RD and illustrates correction values Δ2 to Δ8 calculated using differential values between the raw data as illustrated in FIG. 26. FIG. 29 illustrates final correction values obtained by adding an offset value '512' to each of the correction values Δ1 to Δ8 of FIG. 28. In FIG. 29, a hatched portion indicates data in a generation area of an actual touch input, and the remaining portion except the hatched portion indicates data in a non-touch area.

Figure 30:
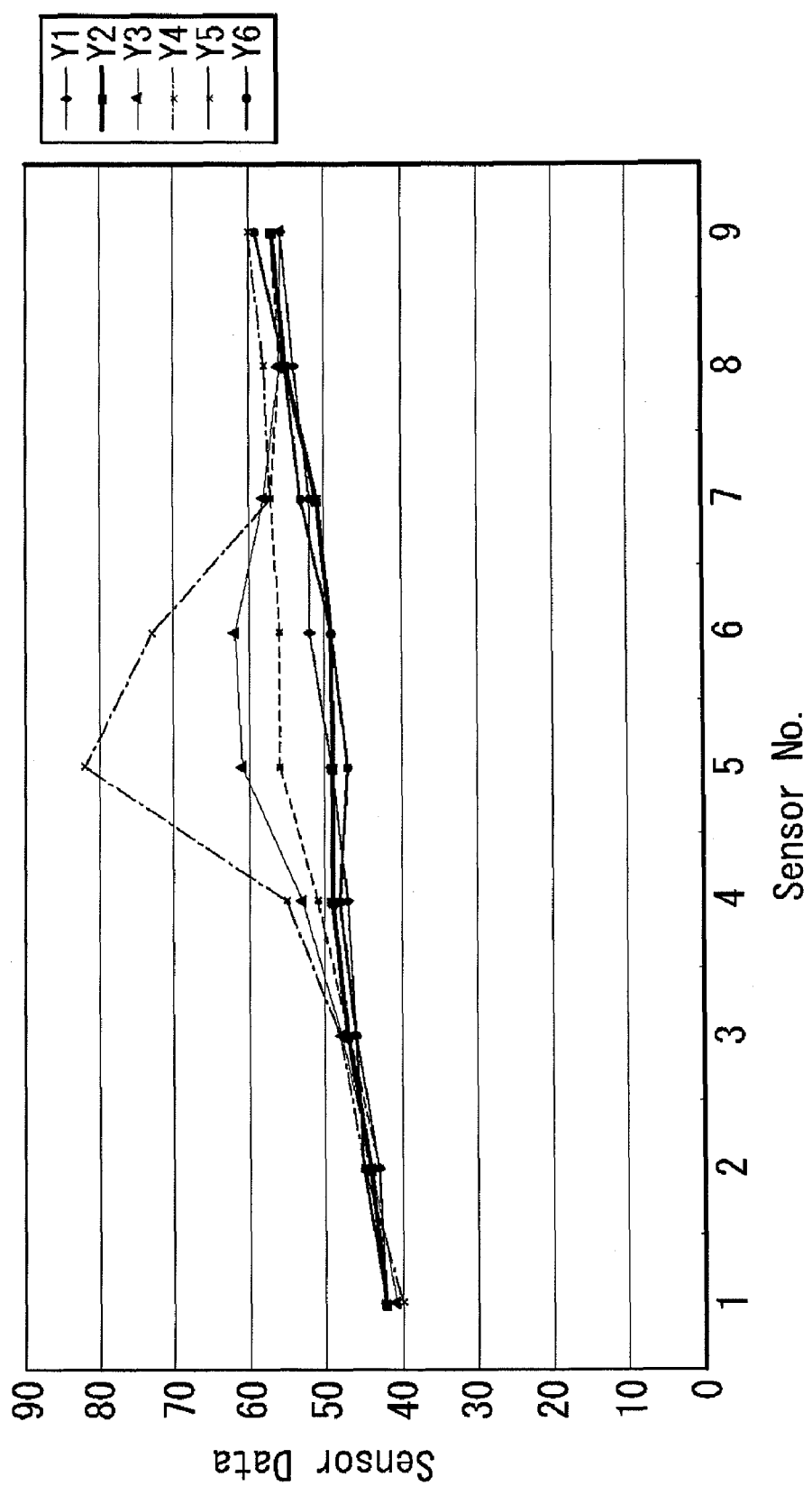
FIGS. 30 and 31 illustrate raw data before performing the correction and an experimental result obtained by correcting the raw data using a correction method illustrated in FIGS. 26 to 29.
Figure 31:
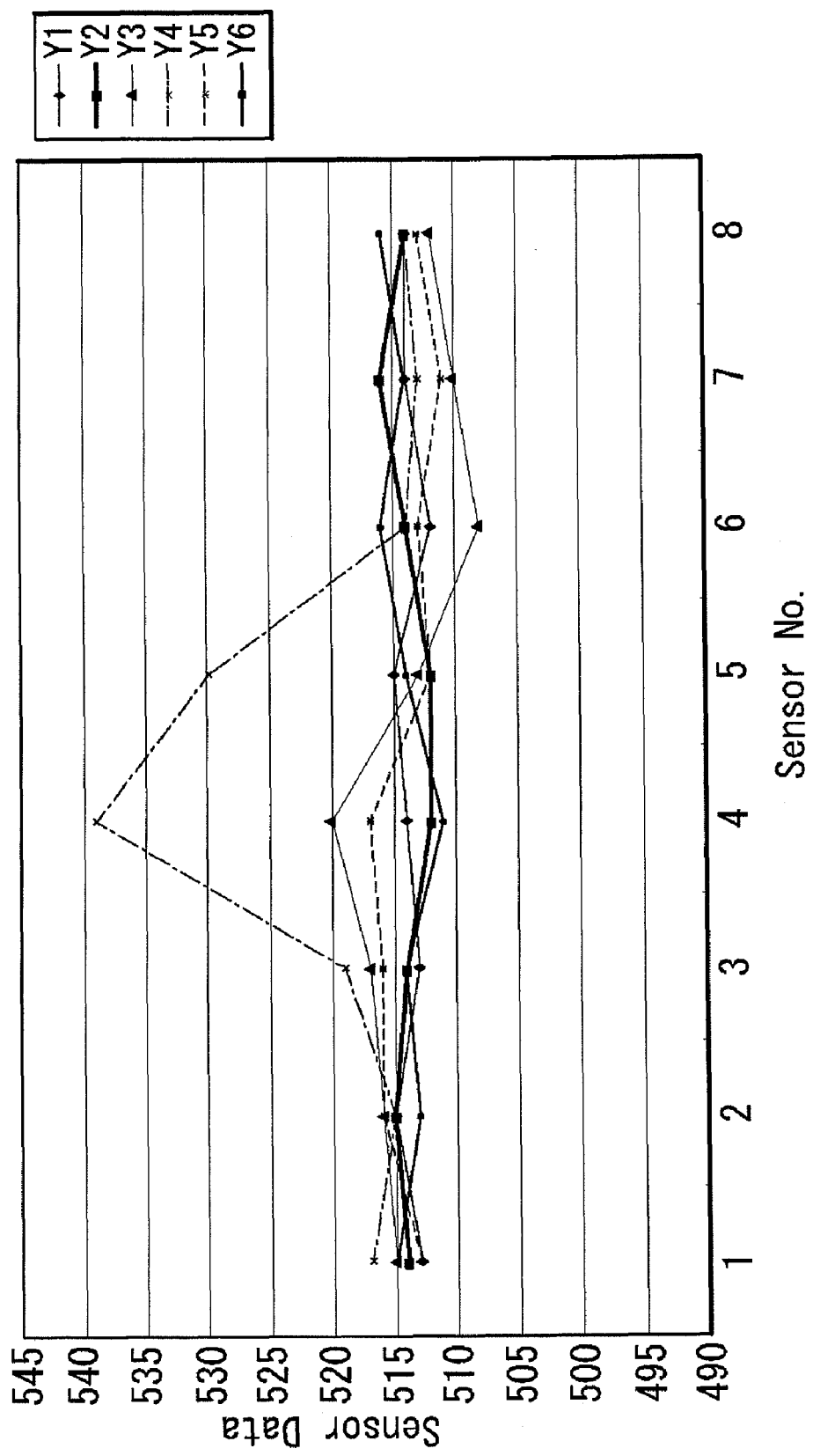

FIG. 30 indicates raw data in first to sixth lines Y1 to Y6 output from the TSIC before performing the correction. FIG. 31 indicates an experimental result by correcting the raw data of FIG. 30 using the correction method illustrated in FIGS. 26 to 29.

As can be seen from FIG. 31, the noise and the swing level included in the raw data of FIG. 30 and the deviation between the TSICs are corrected. In addition to the correction method illustrated in FIGS. 25 to 29, as described above, if the number of successive correction values equal to or greater than a predetermined critical value is less than a predetermined reference value, the correction value equal to or greater than the predetermined critical value is multiplied by zero so as to remove an output of a defective touch sensor. On the other hand, the correction values less than the predetermined critical value is multiplied by a weighted value of 1. If the number of successive correction values equal to or greater than the predetermined critical value is equal to or greater than the predetermined reference value, successive correction values are multiplied by a weighted value of 1.

As described above, in the touch sensing device and the method for correcting an output of the touch sensing device according to the embodiments of the invention, correction values of touch data are calculated using the adjacent touch data and mirror data, and an output of a defective touch sensor is removed from the correction values. Hence, a noise and a shift level of the touch data and an output deviation between the TSICs are corrected.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch sensing device comprising:
a touch sensor array including a plurality of touch sensors;
a plurality of integrated circuits (ICs) that convert an output of the touch sensor array into digital data and generates raw data; and
a data correction unit that generates correction values using differential values between adjacent raw data in the raw data generated by the ICs and removes successive correction values equal to or greater than a predetermined critical value from the correction values when a number of successive correction values equal to or greater than the predetermined critical value is less than a predetermined reference value,
wherein the data correction unit generates a mirror data in each of the ICs and performs a differential operation between the mirror data and a first raw data from each of the ICs to generate a first correction value for the first raw data,
wherein the mirror data for each of the ICs is a pseudo data selected from among the raw data output from each of the ICs, and
wherein when all of the differential values between the adjacent raw data are equal to or less than a predetermined critical value, the data correction unit selects second raw data adjacent to the first raw data as the mirror data.

2. The touch sensing device of claim 1, wherein the data correction unit adds an offset value to each of the correction values.

3. The touch sensing device of claim 1, wherein the touch sensors are formed inside a pixel array of a display panel.

4. The touch sensing device of claim 1, wherein the display panel is a flat panel display panel of one of a liquid crystal display (LCD), a field emission display (FED), a plasma display panel (PDP), and an electroluminescence device (EL).

5. The touch sensing device of claim 1, wherein if there exist differential values exceeding a predetermined critical value among the differential values between the adjacent raw data, the data correction unit compares a number of differential values exceeding the predetermined critical value with a predetermined allowable reference number,
wherein if the number of differential values exceeding the predetermined critical value is less than the predetermined allowable reference number, the data correction unit selects second raw data adjacent to the first raw data as the mirror data.

6. The touch sensing device of claim 1, wherein if there exist successively a plurality of differential values, indicated with a negative number, exceeding a predetermined critical value among the differential values between the adjacent raw data, the data correction unit compares a number of differential values exceeding the predetermined critical value with an allowable reference number,
wherein if the number of differential values exceeding the predetermined critical value is equal to or greater than the allowable reference number, the data correction unit selects raw data most similar to the first raw data among raw data generating the successive differential values, indicated with the negative number, exceeding the predetermined critical value, as the mirror data.

7. The touch sensing device of claim 1, wherein the data correction unit subtracts the mirror data from the first raw data output from the touch sensor to calculate a correction value of the first raw data and calculates correction values of remaining raw data except the first raw data using the differential values between the adjacent raw data,
    wherein the data correction unit adds a previously determined offset value to each of the correction values.

8. The touch sensing device of claim 1, wherein the data correction unit multiplies the successive correction values, whose number is less than the predetermined reference value, equal to or greater than the predetermined critical value by zero,
    wherein the data correction unit multiplies the successive correction values, whose number is equal to or greater than the predetermined reference value by 1.

9. A touch sensing device comprising:
    a touch sensor array including a plurality of touch sensors;
    a plurality of integrated circuits (ICs) that convert an output of the touch sensor array into digital data and generates raw data; and
    a data correction unit that generates correction values using differential values between adjacent raw data in the raw data generated by the ICs and removes successive correction values equal to or greater than a predetermined critical value from the correction values when a number of successive correction values equal to or greater than the predetermined critical value is less than a predetermined reference value,
    wherein the data correction unit generates a mirror data in each of the ICs, and performs a differential operation between the mirror data and a first raw data from each of the ICs to generate a first correction value for the first raw data, and
    wherein the mirror data for each of the ICs is a pseudo data calculated as an average value of the raw data output from each of the ICs.

10. The touch sensing device of claim 9, wherein the data correction unit subtracts the mirror data from the first raw data output from the touch sensor to calculate a correction value of the first raw data and calculates correction values of remaining raw data except the first raw data using the differential values between the adjacent raw data,
    wherein the data correction unit adds a previously determined offset value to each of the correction values.

11. A method for correcting an output of a touch sensing device comprising:
    converting outputs of a plurality of touch sensors into digital data by a plurality of integrated circuits (ICs) connected to the plurality of touch sensors to generate raw data;
    generating a mirror data in each of the ICs;
    performing a differential operation between the mirror data and a first raw data from each of the ICs to generate a first correction value for the first raw data;
    generating correction values using differential values between adjacent raw data in the raw data generated by the ICs; and
    removing successive correction values equal to or greater than a predetermined critical value from the correction values when a number of successive correction values equal to or greater than the predetermined critical value is less than a predetermined reference value,
    wherein the mirror data for each of the ICs is a pseudo data selected from among the raw data output from each of the ICs, and
    wherein when all of the differential values between the adjacent raw data are equal to or less than a predetermined critical value, a second raw data adjacent to the first raw data is selected as the mirror data.

12. The method of claim 11, further comprising adding an offset value to each of the correction values.

13. The method of claim 11, wherein the generating of the mirror data includes:
    if there exist successively a plurality of differential values, indicated with a negative number, exceeding a predetermined critical value among the differential values between the adjacent raw data, comparing a number of differential values exceeding the predetermined critical value with an allowable reference number; and
    if the number of differential values exceeding the predetermined critical value is equal to or greater than the allowable reference number, selecting raw data most similar to the first raw data among raw data generating the successive differential values, indicated with the negative number, exceeding the predetermined critical value, as the mirror data.

14. The method of claim 11, wherein the generating of the correction values includes:
    subtracting the mirror data from the first raw data output from the touch sensor to calculate a correction value of the first raw data; and
    calculating correction values of remaining raw data except the first raw data using the differential values between the adjacent raw data.

15. The method of claim 11, wherein the removing of the successive correction values equal to or greater than the predetermined critical value includes:
    multiplying the successive correction values, whose number is less than the predetermined reference value, equal to or greater than the predetermined critical value by zero; and
    multiplying the successive correction values, whose number is equal to or greater than the predetermined reference value by 1.

* * * * *